(12) United States Patent
Nory et al.

(10) Patent No.: US 12,238,044 B2
(45) Date of Patent: Feb. 25, 2025

(54) SERVING CELL ACTIVATION AND DEACTIVATION

(71) Applicant: Telefonaktiebolaget LM Ericsson (publ), Stockholm (SE)

(72) Inventors: Ravikiran Nory, San Jose, CA (US); Ajit Nimbalker, Fremont, CA (US); Hong Ren, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 434 days.

(21) Appl. No.: 17/602,537

(22) PCT Filed: Apr. 8, 2020

(86) PCT No.: PCT/EP2020/060106
§ 371 (c)(1),
(2) Date: Oct. 8, 2021

(87) PCT Pub. No.: WO2020/208118
PCT Pub. Date: Oct. 15, 2020

(65) Prior Publication Data
US 2022/0173878 A1    Jun. 2, 2022

Related U.S. Application Data

(60) Provisional application No. 62/830,995, filed on Apr. 8, 2019.

(51) Int. Cl.
*H04L 5/00* (2006.01)
(52) U.S. Cl.
CPC .......... *H04L 5/0098* (2013.01); *H04L 5/0055* (2013.01); *H04L 5/0078* (2013.01); *H04L 5/0094* (2013.01)

(58) Field of Classification Search
CPC ... H04L 5/0098; H04L 5/0055; H04L 5/0078; H04L 5/0094
See application file for complete search history.

(56) References Cited

U.S. PATENT DOCUMENTS

| | | | |
|---|---|---|---|
| 8,917,664 B2* | 12/2014 | Jang | H04L 5/0032 370/320 |
| 2014/0177500 A1* | 6/2014 | Han | H04W 72/21 370/311 |

(Continued)

FOREIGN PATENT DOCUMENTS

| | | |
|---|---|---|
| CN | 109588059 A | 4/2019 |
| WO | 2016117928 A1 | 7/2016 |

OTHER PUBLICATIONS

International Search Report and Written Opinion dated Jul. 23, 2020 for International Application No. PCT/EP2020/060106 filed Apr. 8, 2020, consisting of 15-pages.

(Continued)

*Primary Examiner* — Yemane Mesfin
*Assistant Examiner* — Salma Ayad
(74) *Attorney, Agent, or Firm* — Weisberg I.P. Law, P.A.

(57) ABSTRACT

A method, system and apparatus are disclosed. According to one or more embodiments, a method is performed by a wireless device The method includes: determining an activation or a deactivation of a first serving cell associated with a first physical channel; sending a corresponding Hybrid Automatic Repeat reQuest, HARQ, acknowledgment, ACK, in a second physical channel, a subcarrier spacing configuration of the first physical channel being different from a subcarrier spacing of the second physical channel; and performing a procedure related to the first serving cell based at least in part on a time offset, k, the time offset, k, being based at least in part on a reference physical channel.

12 Claims, 8 Drawing Sheets

BEGIN

Determine to initiate a deactivation procedure related to a secondary serving cell based on two different time offsets - a first time offset being used if the secondary serving cell is deactivated using an explicit deactivation command and a second time offset being used upon expiration of a deactivation timer
S138

END

(56) References Cited

U.S. PATENT DOCUMENTS

| | | | |
|---|---|---|---|
| 2015/0030008 A1* | 1/2015 | Lee | H04W 72/0446 |
| | | | 370/336 |
| 2015/0230221 A1* | 8/2015 | Kim | H04W 28/0236 |
| | | | 370/329 |
| 2016/0270019 A1 | 9/2016 | Dinan | |
| 2016/0302177 A1* | 10/2016 | Kwon | H04W 16/32 |
| 2018/0026675 A1 | 1/2018 | Dangy-Caye et al. | |
| 2018/0212742 A1* | 7/2018 | Takeda | H04L 5/0057 |
| 2019/0082408 A1* | 3/2019 | Kim | H04W 72/0453 |
| 2020/0145169 A1* | 5/2020 | Zhou | H04W 76/27 |
| 2020/0389922 A1* | 12/2020 | Xu | H04W 76/27 |
| 2021/0266902 A1* | 8/2021 | Takeda | H04L 5/0098 |
| 2021/0273771 A1* | 9/2021 | Takeda | H04W 72/20 |
| 2022/0039129 A1* | 2/2022 | Takeda | H04W 72/1273 |

OTHER PUBLICATIONS

3GPP TS 38.213 V15.5.0; 3rd Generation Partnership Project; Technical Specification Group Radio Access Network; NR; Physical layer procedures for control (Release 15); Mar. 2019, consisting of 104-pages.
3GPP TS 38.133 V15.5.0; 3rd Generation Partnership Project; Technical Specification Group Radio Access Network; NR; Requirements for support of radio resource management (Release 15); Mar. 2019, consisting of 892-pages.
3GPP TS 38.214 V15.5.0; 3rd Generation Partnership Project; Technical Specification Group Radio Access Network; NR; Physical layer procedures for data (Release 15); Mar. 2019, consisting of 103-pages.
3GPP TS 38.321 V15.5.0; 3rd Generation Partnership Project; Technical Specification Group Radio Access Network; NR; Medium Access Control (MAC) protocol specification (Release 15); Mar. 2019, consisting of 78-pages.
3GPP TSG RAN WG1 Meeting #94 R1-1809144; Title: Maintenance for carrier aggregation and bandwidth parts; Agenda Item: 7.1.3.4; Source: NTT Docomo, Inc.; Document for: Discussion and Decision; Date and Location: Aug. 20-24, 2018, Gothenburg, Sweden, consisting of 21-pages.
Indian Examination Report dated Mar. 30, 2022 for Application No. 202147050581, consisting of 6 pages.
Chinese Office Action and English Summary dated Jul. 29, 2023 for Application No. 202080042324.5, Consisting of 9 pages.
European Search Report dated Aug. 16, 2023 for Application No. 20718301.3, consisting of 16 pages.
3GPP TS 38.321 V15.4.0; 3rd Generation Partnership Project; Technical Specification Group Radio Access Network; NR; Medium Access Control (MAC) protocol specification (Release 15); Dec. 2018, consisting of 77 pages.
3GPP TSG RAN; RAN 2015 Tdoc list (RAN #67-#70); RP 2016 Spreadsheet; 2016, consisting of 78 pages.
3GPP TS 38.133 V15.0.0; 3rd Generation Partnership Project; Technical Specification Group Radio Access Network; NR; Requirements for support of radio resource management (Release 15); Dec. 2017, consisting of 41-pages.

* cited by examiner

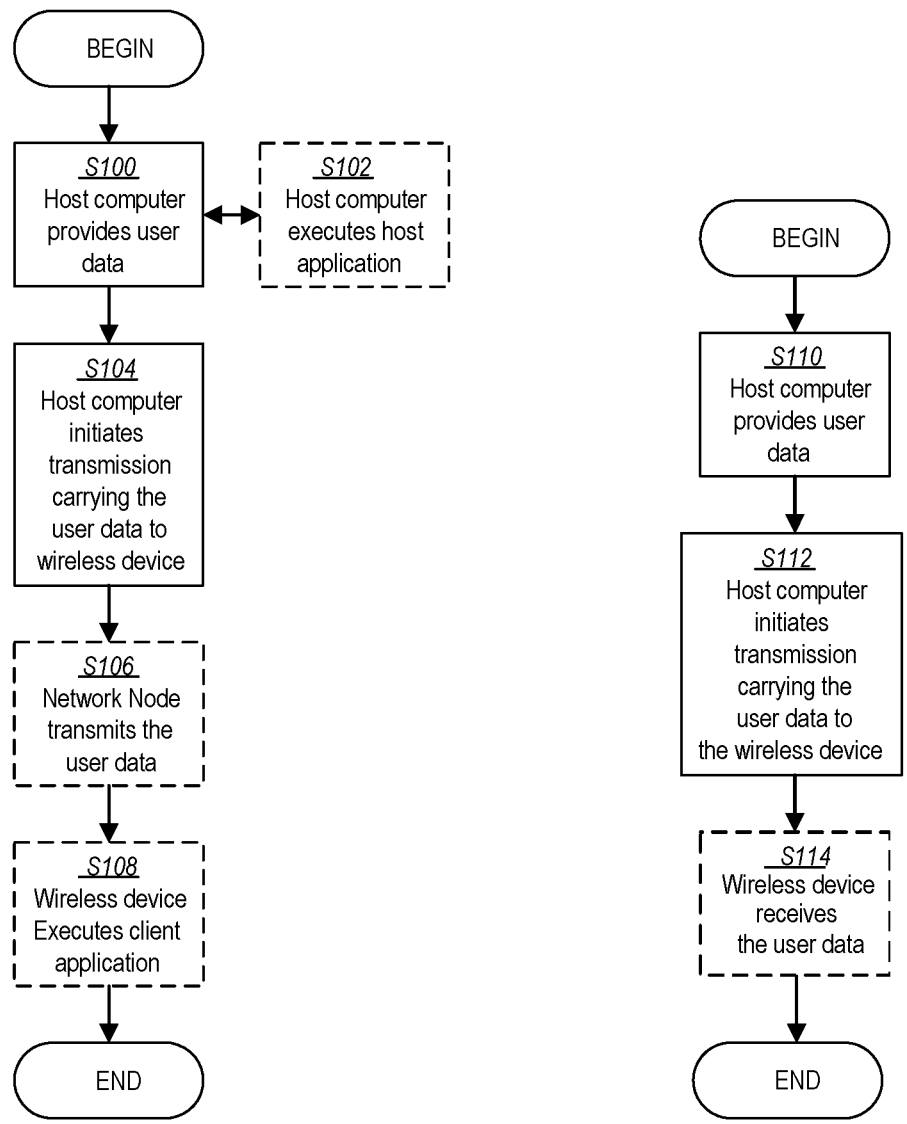

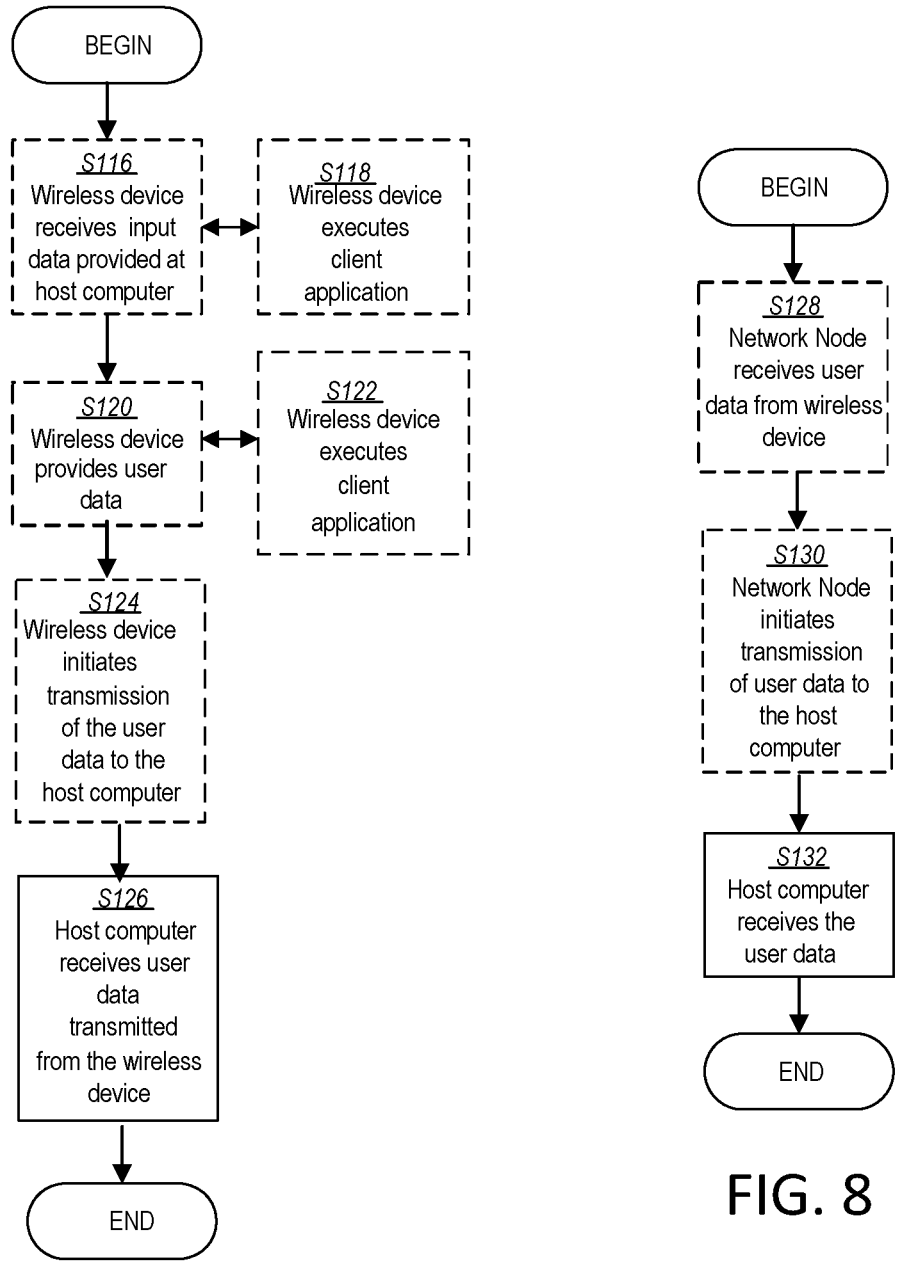

SERVING CELL ACTIVATION AND DEACTIVATION

CROSS-REFERENCE TO RELATED APPLICATIONS

This application is a Submission Under 35 U.S.C. § 371 for U.S. National Stage Patent Application of International Application No.: PCT/EP2020/060106, filed Apr. 8, 2020 entitled "SERVING CELL ACTIVATION AND DEACTIVATION," which claims priority to U.S. Provisional Application No.: 62/830,995, filed Apr. 8, 2019, entitled "ENHANCING CA SCELL ACTIVATION AND DEACTIVATION" the entireties of both of which are incorporated herein by reference.

TECHNICAL FIELD

The present disclosure relates to wireless communications, and in particular, to serving cell activation and/or deactivation.

BACKGROUND

The New Radio (NR) (also known as $5^{th}$ Generation (5G)) standard in the $3^{rd}$ Generation Partnership Project (3GPP) is being designed to provide service for multiple use cases such as enhanced mobile broadband (eMBB), ultra-reliable and low latency communication (URLLC), and machine type communication (MTC). Each of these services may have different technical requirements. For example, the general requirement for eMBB may include a high data rate with moderate latency and moderate coverage, while URLLC service may require a low latency and high reliability transmission but perhaps for moderate data rates.

One of the methods for low latency data transmission is shorter transmission time intervals. In NR, in addition to transmission in a slot, a mini-slot transmission is also allowed, thereby facilitating the reduction of latency. A mini-slot may include any number of 1 to 14 Orthogonal frequency-division multiplexing (OFDM) symbols. FIG. 1 is a diagram of an example radio resource in NR. The concepts of slot and mini-slot are not specific to a specific service in that a mini-slot may be used for either eMBB, URLLC, or other services.

In NR, multiple OFDM numerologies are supported as described in Table 1 below where μ and the cyclic prefix for a bandwidth part are obtained from the higher-layer parameter subcarrierSpacing and cyclicPrefix, respectively.

TABLE 1

| Supported transmission numerologies | | |
|---|---|---|
| μ | $\Delta f = 2^{\mu} \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |

In NR, for subcarrier spacing (SCS) configuration μ, slots are numbered $n_s^{\mu} \in \{0, \ldots, N_{slot}^{subframe,\mu}-1\}$ in increasing order within a subframe and $n_{s,f}^{\mu} \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as may be provided in certain standards. The start of slot $n_s^{\mu}$ in a subframe is aligned in time with the start of OFDM symbol $n_s^{\mu} N_{symb}^{slot}$ in the same subframe. $N_{slot}^{subframe,\mu}$ is number of slots per subframe for subcarrier spacing configuration μ.

Carrier Aggregation is generally used in NR (5G) and Long Term Evolution (LTE) systems to help improve wireless device transmit-receive data rate. With carrier aggregation (CA), the wireless device typically operates initially on a single serving cell called a primary cell (Pcell). The Pcell is operated on a component carrier in a frequency band. The wireless device may then be configured by the network/network node with one or more secondary serving cells (Scell(s)). Each Scell can correspond to a component carrier (CC) in the same frequency band (intra-band CA) or different frequency band (inter-band CA) from the frequency band of the CC corresponding to the Pcell. For the wireless device to transmit/receive data on the Scell(s) (e.g., by receiving downlink shared channel (DL-SCH) information on a physical downlink shared channel (PDSCH) or by transmitting uplink shared channel (UL-SCH) on a physical uplink shared channel (PUSCH), the Scell(s) may be activated by the network. The Scell(s) can also be deactivated and later reactivated as needed via activation/deactivation signaling.

FIG. 2 is a diagram of example Scell activation/deactivation related procedures specified for 3GPP Release 15 (Rel-15) NR. As shown in FIG. 2, except for channel state information (CSI) reporting, the wireless device may be allowed to start performing other 'activation related actions' (e.g., physical downlink control channel (PDCCH) monitoring for Scell, physical uplink shared channel (PUCCH)/sounding reference signaling (SRS) transmission on the Scell) within a specified range of slots, i.e., after the minimum required activation delay (as may be specified in some wireless communication standards such as, for example, in Third Generation Partnership Project (3GPP) Technical Specification (TS) 38.213) and before the maximum allowed activation delay (as may be specified in some wireless communication standards such as, for example, in 3GPP TS 38.133). CSI reporting for the Scell starts (and stops) with a fixed slot offset after receiving the activation (deactivation) command.

Below the minimum required activation delay and maximum allowed activation delay for some example conditions are described:
  a minimum required activation delay is k1+3 millisecond (ms)+1 slots as specified in some wireless communication standards such as, for example, 3GPP TS 38.213 sub clause 4.3. Assuming 30 kilohertz (kHz) numerology for Pcell, and k1=4, this minimum required activation delay would be 5.5 ms.
  a maximum allowed activation delay depends on conditions described in some wireless communication standards such as, for example, in 3GPP TS 38.133 sub clause 8.3.2 and the value varies based on wireless device measurement configuration, operating frequency range and other aspects.
    Assuming T_HARQ as described in some wireless communication standards such as, for example, in 3GPP TS 38.133 has similar meaning as k1 in 3GPP TS 38.213, and assuming 'known Scell' with Scell measurement cycle is equal to or smaller than [160 ms], and T_csi_reporting=4 slots:
    For frequency 1 (FR1) and 30 kHz SCS,
      If synchronization signal/physical broadcast channel block measurement time configuration (SMTC) periodicity is 5 ms, the delay may not be larger than (T_HARQ=4 slots)+(T_act_time=5 ms+5 ms)+(T_csi_report=4 slots)=14 ms;

SMTC periodicity 20 ms, the delay may not be larger than (T_HARQ=4 slots)+(T_act_time=5 ms+20 ms)+(T_csi_report=4 slots)=29 ms.

For frequency 2 (FR2), assuming this is the first Scell being activated in that FR2 band, SMTC periodicity is 5 ms, the delay is 4 slots+5 ms+TBD*5 ms+4 slots=6 ms+X*5 ms;

SMTC periodicity is 20 ms, the delay is 4 slots+5 ms+TBD*20 ms+4 slots=6 ms+X*20 ms X>1 is TBD in current 3GPP Release 15 (Rel 15) specification.

For other conditions, e.g., Scell is not 'known' and/or longer SMTC periodicities conditions, the maximum allowed activation delay may be much longer than the values in the above example.

SUMMARY

Some embodiments advantageously provide methods, systems, and apparatuses for serving cell activation and/or deactivation such as when different numerologies are configured and/or a deactivation timer expires.

According to one aspect of the present disclosure, a method implemented by a wireless device is provided. The method includes determining an activation or a deactivation of a first serving cell associated with a first physical channel; sending a corresponding Hybrid Automatic Repeat reQuest, HARQ, acknowledgment, ACK, in a second physical channel, a subcarrier spacing configuration of the first physical channel being different from a subcarrier spacing of the second physical channel; and performing a procedure related to the first serving cell based at least in part on a time offset, k, the time offset, k, being based at least in part on a reference physical channel.

In some embodiments of this aspect, the determining comprises receiving a command from a network node for the activation or the deactivation of the first serving cell in the first physical channel. In some embodiments of this aspect, the reference physical channel is the second physical channel, and the time offset, k, is based at least in part on the subcarrier spacing configuration of the reference physical channel. In some embodiments of this aspect, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH. In some embodiments of this aspect, the time offset, k, is applied after receiving the command for the activation and the time offset, k, includes a number of slots for a PUCCH transmission after reception of the PDSCH.

In some embodiments of this aspect, performing the procedure related to the first serving cell includes performing at least channel state information, CSI, reporting for the first serving cell in response to receiving the command for the activation of the first serving cell. In some embodiments of this aspect, the wireless device is configured with carrier aggregation and the command for the activation or the deactivation is a medium access control, MAC, command element, CE. In some embodiments of this aspect, receiving the command for the activation or the deactivation of the first serving cell further includes receiving the command in a second serving cell different from the first serving cell. In some embodiments of this aspect, the procedure related to the first serving cell comprises a deactivation procedure and the deactivation procedure includes stopping at least one of channel state information, CSI, reporting, physical downlink control channel, PDCCH, monitoring and sounding reference signal, SRS, transmission on the first serving cell in response to receiving the command for deactivation of the first serving cell. In some embodiments of this aspect, the procedure related to the first serving cell comprises an activation procedure and the activation procedure includes starting at least one of channel state information, CSI, reporting, physical downlink control channel, PDCCH, monitoring and sounding reference signal, SRS, transmission on the first serving cell in response to receiving the command for activation of the first serving cell.

In some embodiments of this aspect, the determining the deactivation comprises a deactivation procedure related to the first serving cell, the deactivation procedure related to the first serving cell being based at least in part on two different time offsets for applying serving cell deactivation actions, a first time offset being used if the first serving cell is deactivated using an explicit deactivation command and a second time offset being used if the first serving cell is deactivated upon expiration of a deactivation timer for the first serving cell, the first serving cell being a secondary serving cell. In some embodiments of this aspect, the first time offset is based at least in part on a subcarrier spacing configuration of the second physical channel; and the second time offset is based at least in part on information related to a physical channel of a scheduling cell of the first serving cell for which the deactivation timer expires.

According to yet another aspect of the present disclosure, a method implemented in a network node configured to communicate with a wireless device is provided. The method includes determining an activation or a deactivation of a first serving cell associated with a first physical channel; and receiving a corresponding Hybrid Automatic Repeat reQuest, HARQ, acknowledgment, ACK, in a second physical channel, a subcarrier spacing configuration of the first physical channel being different from a subcarrier spacing of the second physical channel, and the activation or the deactivation of the first serving cell initiating a procedure related to the first serving cell, the procedure based at least in part on a time offset, k, the time offset, k, based at least in part on a reference physical channel.

In some embodiments of this aspect, the determining comprises sending a command for the activation or the deactivation of the first serving cell in the first physical channel. In some embodiments of this aspect, the reference physical channel is the second physical channel, and the time offset, k, is based at least in part on the subcarrier spacing configuration of the reference physical channel. In some embodiments of this aspect, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH.

In some embodiments of this aspect, the time offset, k, is applied after the wireless device receives the command for the activation and the time offset, k, includes a number of slots for a PUCCH transmission after reception of the PDSCH. In some embodiments of this aspect, the procedure related to the first serving cell includes at least channel state information, CSI, reporting for the first serving cell in response to the command for activation of the first serving cell. In some embodiments of this aspect, the method further includes configuring the wireless device with carrier aggregation; and the command for the activation or the deactivation is a medium access control, MAC, command element, CE. In some embodiments of this aspect, sending the command for the activation or the deactivation of the first serving cell further includes sending the command in a second serving cell different from the first serving cell.

In some embodiments of this aspect, the procedure related to the first serving cell comprises a deactivation procedure and the deactivation procedure includes the wireless device stopping at least one of channel state information, CSI, reporting, physical downlink control channel, PDCCH, monitoring and sounding reference signal, SRS, transmission on the first serving cell in response to the command for deactivation of the first serving cell. In some embodiments of this aspect, the procedure related to the first serving cell comprises an activation procedure and the activation procedure includes starting at least one of channel state information, CSI, reporting, physical downlink control channel, PDCCH, monitoring and sounding reference signal, SRS, transmission on the first serving cell in response to receiving the command for activation of the first serving cell.

In some embodiments of this aspect, the procedure related to the first serving cell comprises a deactivation procedure related to the first serving cell, the deactivation procedure related to the first serving cell being based at least in part on two different time offsets for applying serving cell deactivation actions, a first time offset being used if the first serving cell is deactivated using an explicit deactivation command and a second time offset being used if the first serving cell is deactivated upon expiration of a deactivation timer for the first serving cell, the first serving cell being a secondary serving cell. In some embodiments of this aspect, one or more of: the first time offset is based at least in part on a subcarrier spacing configuration of the second physical channel; and the second time offset is based at least in part on information related to a physical channel of a scheduling cell of the first serving cell for which the deactivation timer expires.

According to another aspect of the present disclosure, a wireless device configured to communicate with a network node is provided. The wireless device includes processing circuitry. The processing circuitry is configured to cause the wireless device to determine an activation or a deactivation of a first serving cell associated with a first physical channel; send a corresponding Hybrid Automatic Repeat reQuest, HARQ, acknowledgment, ACK, in a second physical channel, a subcarrier spacing configuration of the first physical channel being different from a subcarrier spacing of the second physical channel; and perform a procedure related to the first serving cell based at least in part on a time offset, k, the time offset, k, being based at least in part on a reference physical channel.

In some embodiments of this aspect, the processing circuitry is configured to cause the wireless device to determine by being configured to cause the wireless device to receive a command from the network node for the activation or the deactivation of the first serving cell in the first physical channel. In some embodiments of this aspect, the reference physical channel is the second physical channel, and the time offset, k, is based at least in part on the subcarrier spacing configuration of the reference physical channel. In some embodiments of this aspect, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH.

In some embodiments of this aspect, the time offset, k, is applied after receiving the command for the activation and the time offset, k, includes a number of slots for a PUCCH transmission after reception of the PDSCH. In some embodiments of this aspect, the processing circuitry is configured to cause the wireless device to perform the procedure related to the first serving cell by being configured to cause the wireless device to perform at least channel state information, CSI, reporting for the first serving cell in response to receiving the command for the activation of the first serving cell. In some embodiments of this aspect, the wireless device is configured with carrier aggregation and the command for the activation or the deactivation is a medium access control, MAC, command element, CE. In some embodiments of this aspect, the processing circuitry is configured to cause the wireless device to receive the command for the activation or the deactivation of the first serving cell by being configured to cause the wireless device to receive the command in a second serving cell different from the first serving cell.

In some embodiments of this aspect, the procedure related to the first serving cell comprises a deactivation procedure and the deactivation procedure includes stopping at least one of channel state information, CSI, reporting, physical downlink control channel, PDCCH, monitoring and sounding reference signal, SRS, transmission on the first serving cell in response to receiving the command for deactivation of the first serving cell. In some embodiments of this aspect, the procedure related to the first serving cell comprises an activation procedure and the activation procedure includes starting at least one of channel state information, CSI, reporting, physical downlink control channel, PDCCH, monitoring and sounding reference signal, SRS, transmission on the first serving cell in response to receiving the command for activation of the first serving cell.

In some embodiments of this aspect, the processing circuitry is configured to cause the wireless device to determine by being configured to cause the wireless device to perform a deactivation procedure related to the first serving cell, the deactivation procedure related to the first serving cell being based at least in part on two different time offsets for applying serving cell deactivation actions, a first time offset being used if the first serving cell is deactivated using an explicit deactivation command and a second time offset being used if the first serving cell is deactivated upon expiration of a deactivation timer for the first serving cell, the first serving cell being a secondary serving cell. In some embodiments of this aspect, one or more of: the first time offset is based at least in part on a subcarrier spacing configuration of the second physical channel; and the second time offset is based at least in part on information related to a physical channel of a scheduling cell of the first serving cell for which the deactivation timer expires.

According to another aspect of the present disclosure, a network node configured to communicate with a wireless device is provided. The network node includes processing circuitry. The processing circuitry is configured to cause the network node to optionally, determine an activation or a deactivation of a first serving cell associated with a first physical channel; and receive a corresponding Hybrid Automatic Repeat reQuest, HARQ, acknowledgment, ACK, in a second physical channel, a subcarrier spacing configuration of the first physical channel being different from a subcarrier spacing of the second physical channel, and the activation or the deactivation of the first serving cell initiating a procedure related to the first serving cell, the procedure based at least in part on a time offset, k, the time offset, k, based at least in part on a reference physical channel.

In some embodiments of this aspect, the processing circuitry is configured to cause the network node to determine by being configured to cause the network node to send a command for the activation or the deactivation of the first serving cell in the first physical channel. In some embodiments of this aspect, the reference physical channel is the second physical channel, and the time offset, k, is based at least in part on the subcarrier spacing configuration of the reference physical channel. In some embodiments of this aspect, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH. In some embodiments of this aspect, the time offset, k, is applied after the wireless device receives the command for the activation and the time offset, k, includes a number of slots for a PUCCH transmission after reception of the PDSCH.

In some embodiments of this aspect, the procedure related to the first serving cell includes at least channel state information, CSI, reporting for the first serving cell in response to the command for activation of the first serving cell. In some embodiments of this aspect, the processing circuitry is further configured to cause the network node to configure the wireless device with carrier aggregation; and the command for the activation or the deactivation is a medium access control, MAC, command element, CE. In some embodiments of this aspect, the processing circuitry configured to cause the network node to send the command for the activation or the deactivation of the first serving cell by being configured to cause the network node to send the command in a second serving cell different from the first serving cell. In some embodiments of this aspect, the procedure related to the first serving cell comprises a deactivation procedure and the deactivation procedure includes the wireless device stopping at least one of channel state information, CSI, reporting, physical downlink control channel, PDCCH, monitoring and sounding reference signal, SRS, transmission on the first serving cell in response to the command for deactivation of the first serving cell. In some embodiments of this aspect, the procedure related to the first serving cell comprises an activation procedure and the activation procedure includes starting at least one of channel state information, CSI, reporting, physical downlink control channel, PDCCH, monitoring and sounding reference signal, SRS, transmission on the first serving cell in response to receiving the command for activation of the first serving cell.

In some embodiments of this aspect, the procedure related to the first serving cell comprises a deactivation procedure related to the first serving cell, the deactivation procedure related to the first serving cell being based at least in part on two different time offsets for applying serving cell deactivation actions, a first time offset being used if the first serving cell is deactivated using an explicit deactivation command and a second time offset being used if the first serving cell is deactivated upon expiration of a deactivation timer for the first serving cell, the first serving cell being a secondary serving cell. In some embodiments of this aspect, one or more of: the first time offset is based at least in part on a subcarrier spacing configuration of the second physical channel; and the second time offset is based at least in part on information related to a physical channel of a scheduling cell of the first serving cell for which the deactivation timer expires.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating example methods implemented in a communication system including a host computer, a network node and a wireless device for executing a client application at a wireless device according to some embodiments of the present disclosure;

FIG. 6 is a flowchart illustrating example methods implemented in a communication system including a host computer, a network node and a wireless device for receiving user data at a wireless device according to some embodiments of the present disclosure;

FIG. 7 is a flowchart illustrating example methods implemented in a communication system including a host computer, a network node and a wireless device for receiving user data from the wireless device at a host computer according to some embodiments of the present disclosure;

FIG. 8 is a flowchart illustrating example methods implemented in a communication system including a host computer, a network node and a wireless device for receiving user data at a host computer according to some embodiments of the present disclosure;

DETAILED DESCRIPTION

Figure 1:
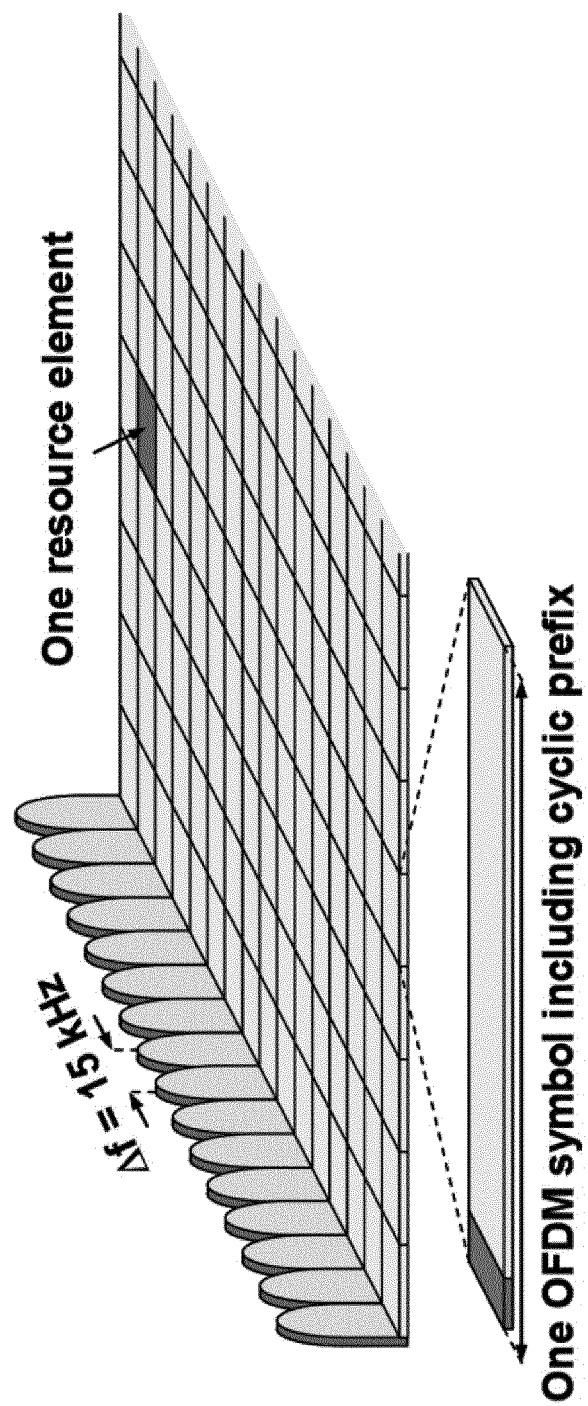
FIG. 1 is a diagram of a radio resource arrangement in New Radio (NR)
Figure 2:
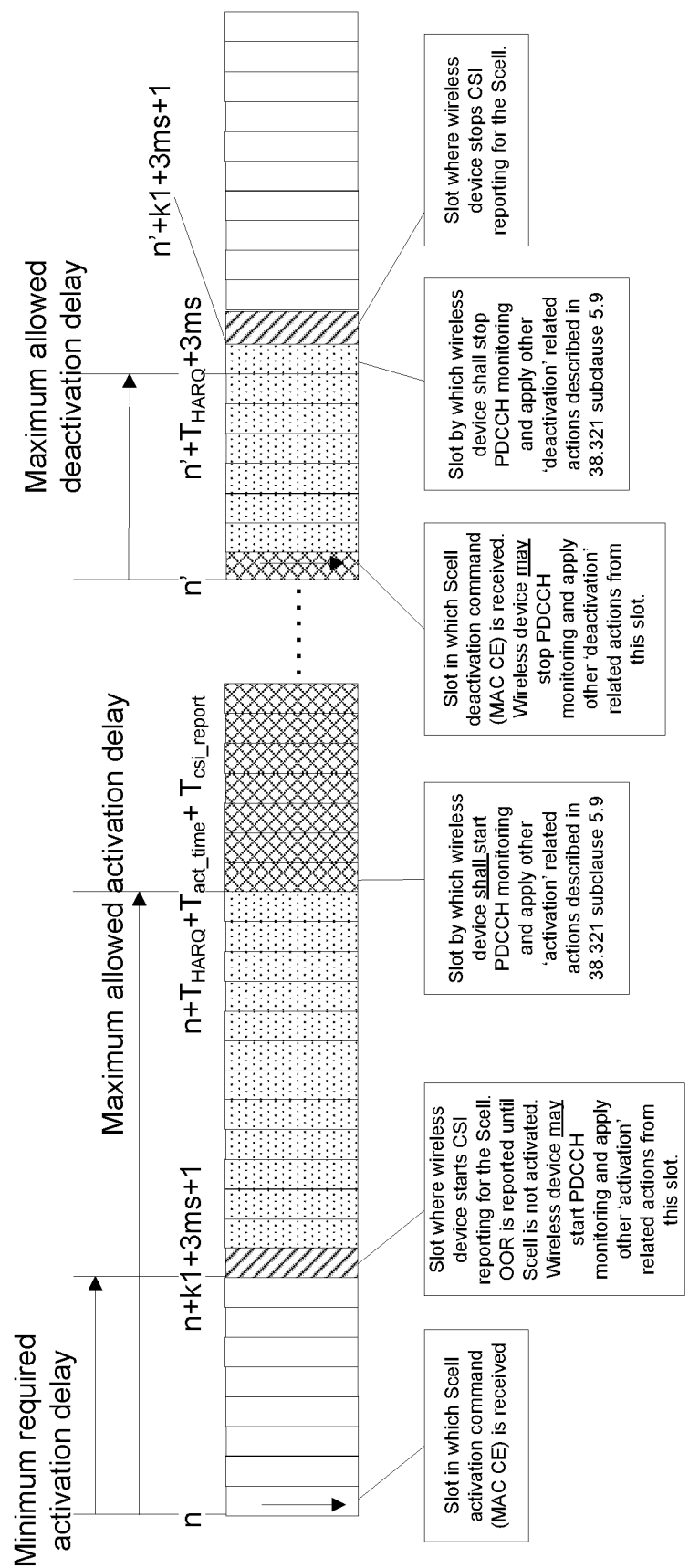
FIG. 2 is a diagram of an example Scell activation/deactivation procedures.

The Scell activation procedure in NR (e.g., as described in wireless communication standards such as, for example, in section 4.3 of 3GPP TS 38.213 f40) may be incorrect and may be improved for e.g., one or more of the following cases:

Case 1: when activation command medium access control (MAC) control element (CE) for Scell1 is sent in a physical downlink shared channel (PDSCH) (e.g., on Scell2), and the PDSCH has different numerology than a PUCCH transmission (e.g., on Pcell).

Case 2: when a Scell deactivation timer expires.

For case 1, according to a procedure $k=k_1+3\cdot N_{slot}^{subframe,\mu}+1$ which is counted in slots of PUCCH numerology (e.g., 15 kHz). However, if activation command is sent in SCell2 PDSCH in slot n with different numerology (e.g., 30 kHz) then the term 'slot n+k' may not have e.g., an accurate meaning (since n and k are defined with different numerologies in this case). Thus, this may lead to a difficult requirement on the wireless device side that may start an activation procedure (such as CSI reporting) even before the acknowledgement (ACK) feedback for the PDSCH is transmitted on the uplink.

For case 2, k1 and µ may not have an e.g., accurate meaning as there is no deactivation command associated with this case. Thus, the current procedure for SCell deactivation based on the timer may be undefined, and hence the wireless device may not be able to deactivate properly, which may lead to incorrect understanding of the deactivation time between the network/network node and wireless device, which may then lead to an unusual deactivation based on the timer, leading to increased wireless device power consumption as well as network overhead.

Some embodiments of the present disclosure may provide for one or more of:

1. A scaling factor $2^{\mu_{PDSCH}-\mu}$ is used for k, to normalize the numerology between k and n, so that the term n+k is correctly defined regardless of the numerology of PDSCH containing activation command ($\mu_{PDSCH}$) and the numerology of the corresponding PUCCH transmission (µ).

2. For the case where Scell deactivation timer expires, k may be set to a value that is independent of a value determined from a dynamically scheduled PDSCH. For example, k can be set to a value defined in number of slots, with a reference slot duration defined based on a reference numerology associated with a reference channel/signal of a reference serving cell.

Some embodiments of the instant disclosure may solve at least a portion of the problems with existing systems by providing one or more of:

1. a process of determining the time offset for applying the actions related to Scell activation command reception, such as for the case when different sub-carrier spacing (SCS) values are used for transmission of activation command (e.g., in PDCCH or PDSCH with SCS1) and reception of HARQ-ACK corresponding to the activation command (e.g., in PUCCH with SCS2). With a clear and unambiguous activation procedure/process, both network/network node and wireless device can have correct knowledge of the activation command (i.e., when the activation command can be applied) in case of multiple numerologies, and thus the activation procedure may work optimally, improving overall system performance.

2. a process for determining the time offset that may be required for applying deactivation related actions depending on whether the deactivation is performed using an explicit deactivation command (in which the time offset is based on one or more parameters related to the deactivation command) or expiry/expiration of an Scell deactivation timer (in which case time offset is a fixed value). With a clear and unambiguous deactivation procedure/process, both network/ network node and wireless device can have correct knowledge of when deactivation based on a timer can be applied, and thus the deactivation procedure may work optimally with low overhead, improving overall system performance.

Before describing in detail example embodiments, it is noted that the embodiments reside primarily in combinations of apparatus components and processing steps related to serving cell activation and/or deactivation such as when different numerologies are configured. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/ multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device or a radio network node.

In some embodiments, the non-limiting terms wireless device or a user equipment (UE) are used interchangeably. The wireless device herein can be any type of wireless device capable of communicating with a network node or another wireless device over radio signals, such as wireless device. The wireless device may also be a radio communication device, target device, device to device (D2D) wireless device, machine type wireless device or wireless device capable of machine to machine communication (M2M), low-cost and/or low-complexity wireless device, a sensor equipped with wireless device, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

In some embodiments, the terms "numerology" and "subcarrier spacing" are used interchangeably.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB, IAB node, or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
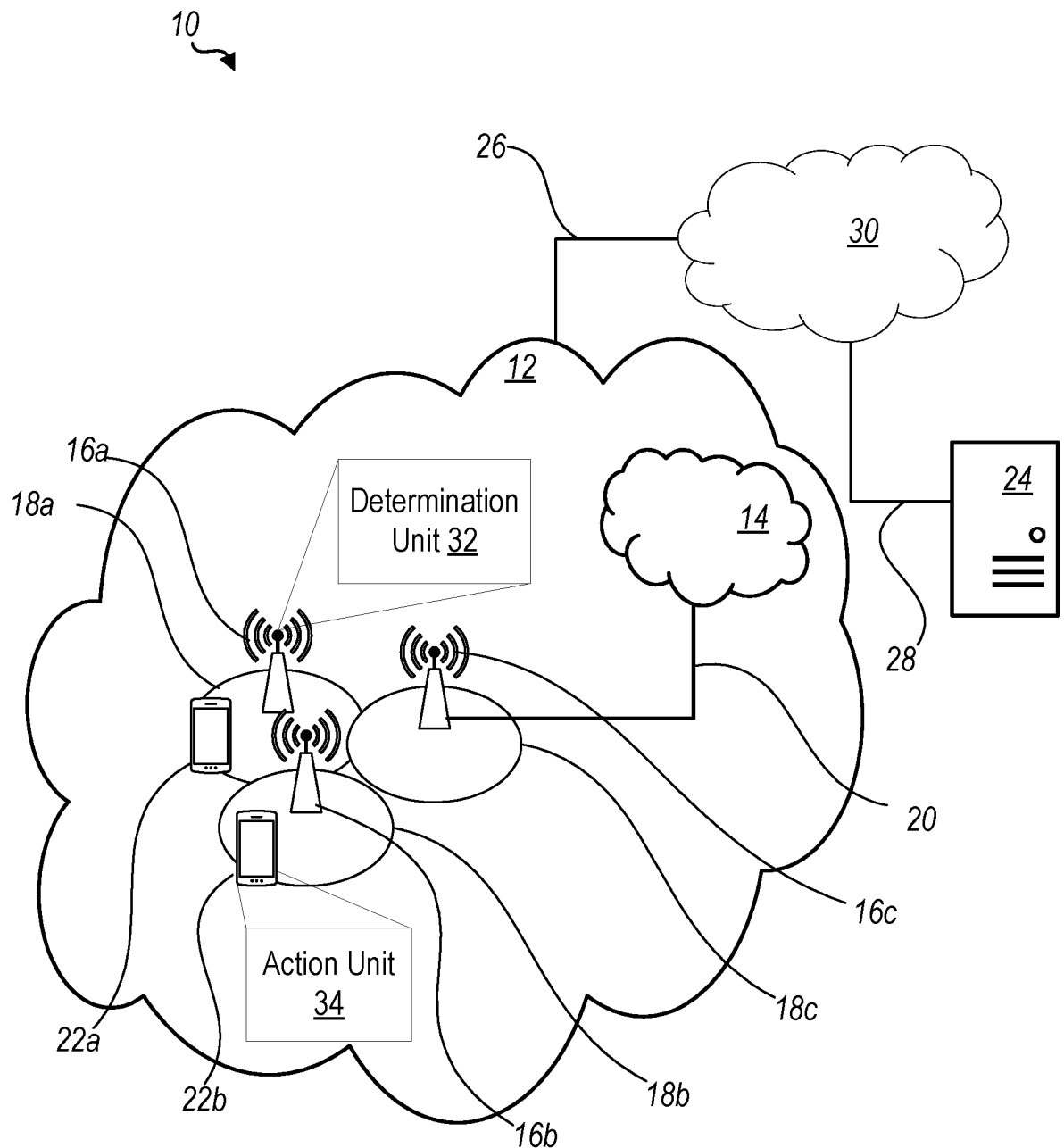
FIG. 3 is a schematic diagram of an example network architecture illustrating a communication system connected via an intermediate network to a host computer according to the principles in the present disclosure.

Embodiments provide serving cell activation and/or deactivation such as when different numerologies are configured. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device 22a located in coverage area 18a is configured to wirelessly connect to, or be paged by, the corresponding network node 16a. A second wireless device 22b in coverage area 18b is wirelessly connectable to the corresponding network node 16b. While a plurality of wireless devices 22a, 22b (collectively referred to as wireless devices 22) are illustrated in this example, the disclosed embodiments are equally applicable to a situation where a sole wireless device is in the coverage area or where a sole wireless device is connecting to the corresponding network node 16. Note that although only two wireless devices 22 and three network nodes 16 are shown for convenience, the communication system may include many more wireless devices 22 and network nodes 16.

Also, it is contemplated that a wireless device 22 can be in simultaneous communication and/or configured to separately communicate with more than one network node 16 and more than one type of network node 16. For example, a wireless device 22 can have dual connectivity with a network node 16 that supports LTE and the same or a different network node 16 that supports NR. As an example, wireless device 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected wireless devices 22a, 22b and the host computer 24. The connectivity may be described as an over-the-top (OTT) connection. The host computer 24 and the connected wireless devices 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected wireless device 22a. Similarly, the network node 16 need not be aware of the future routing of an outgoing uplink communication originating from the wireless device 22a towards the host computer 24.

A network node 16 is configured to include a determination unit 32 which is configured to cause the network node 16 to send a command for activation or deactivation of a first serving cell in a first physical channel; and receive a corresponding Hybrid Automatic Repeat reQuest, HARQ, acknowledgment, ACK, in a second physical channel, a subcarrier spacing configuration of the first physical channel being different from a subcarrier spacing of the second physical channel and the command for activation or deactivation of the first serving cell initiating a procedure related to the first serving cell, the procedure based at least in part on a time offset, k, the time offset, k, based at least in part on a reference physical channel.

In some embodiments, network node 16 is configured to include a determination unit 32 which is configured to cause the network node 16 to determine to initiate a deactivation procedure related to a secondary serving cell, the deactivation procedure related to the secondary serving cell being based at least in part on two different time offsets for applying serving cell deactivation actions, a first time offset being used if the secondary serving cell is deactivated using an explicit deactivation command and a second time offset being used if the secondary serving cell is deactivated upon expiration of a deactivation timer for the secondary serving cell.

A wireless device 22 is configured to include an action unit 34 which is configured to cause the wireless device 22 to receive a command for activation or deactivation of a first serving cell in a first physical channel; send a corresponding Hybrid Automatic Repeat reQuest, HARQ, acknowledgment, ACK, in a second physical channel, a subcarrier spacing configuration of the first physical channel being different from a subcarrier spacing of the second physical channel; and perform a procedure related to the first serving cell based at least in part on a time offset, k, the time offset, k, being based at least in part on a reference physical channel.

In some embodiments, wireless device 22 is configured to include an action unit 34 which is configured to cause the wireless device 22 to determine to perform a deactivation procedure related to a secondary serving cell, the deactivation procedure related to the secondary serving cell being based at least in part on two different time offsets for applying serving cell deactivation actions, a first time offset being used if the secondary serving cell is deactivated using an explicit deactivation command and a second time offset being used if the secondary serving cell is deactivated upon expiration of a deactivation timer for the secondary serving cell.

Example implementations, in accordance with an embodiment, of the wireless device 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a wireless device 22 connecting via an OTT connection 52 terminating at the wireless device 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of process, forward, relay, determine, transmit, receive, store, indicate, etc., information related to serving cell activation and/or deactivation such as when different numerologies are configured.

The communication system 10 further includes a network node 16 provided in a communication system 10 and including hardware 58 enabling it to communicate with the host computer 24 and with the wireless device 22. The hardware 58 may include a communication interface 60 for setting up and maintaining a wired or wireless connection with an interface of a different communication device of the communication system 10, as well as a radio interface 62 for setting up and maintaining at least a wireless connection 64 with a wireless device 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determination unit 32 configured to perform one or more network node 16 functions (i.e., serving cell functions) as described herein such as with respect to serving cell activation and/or deactivation such as when different numerologies are configured.

The communication system 10 further includes the wireless device 22 already referred to. The wireless device 22 may have hardware 80 that may include a radio interface 82 configured to set up and maintain a wireless connection 64 with a network node 16 serving a coverage area 18 in which the wireless device 22 is currently located. The radio interface 82 may be formed as or may include, for example, one or more RF transmitters, one or more RF receivers, and/or one or more RF transceivers.

The hardware 80 of the wireless device 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the wireless device 22 may further comprise software 90, which is stored in, for example, memory 88 at the wireless device 22, or stored in external memory (e.g., database, storage array, network storage device, etc.) accessible by the wireless device 22. The software 90 may be executable by the processing circuitry 84. The software 90 may include a client application 92. The client application 92 may be operable to provide a service to a human or non-human user via the wireless device 22, with the support of the host computer 24. In the host computer 24, an executing host application 50 may communicate with the executing client application 92 via the OTT connection 52 terminating at the wireless device 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by wireless device 22. The processor 86 corresponds to one or more processors 86 for performing wireless device 22 functions described herein. The wireless device 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to wireless device 22. For example, the processing circuitry 84 of the wireless device 22 may include an action unit 34 configured to perform one or more wireless device 22 function as described herein such as with respect to serving cell activation and/or deactivation such as when different numerologies are configured.

Figure 4:
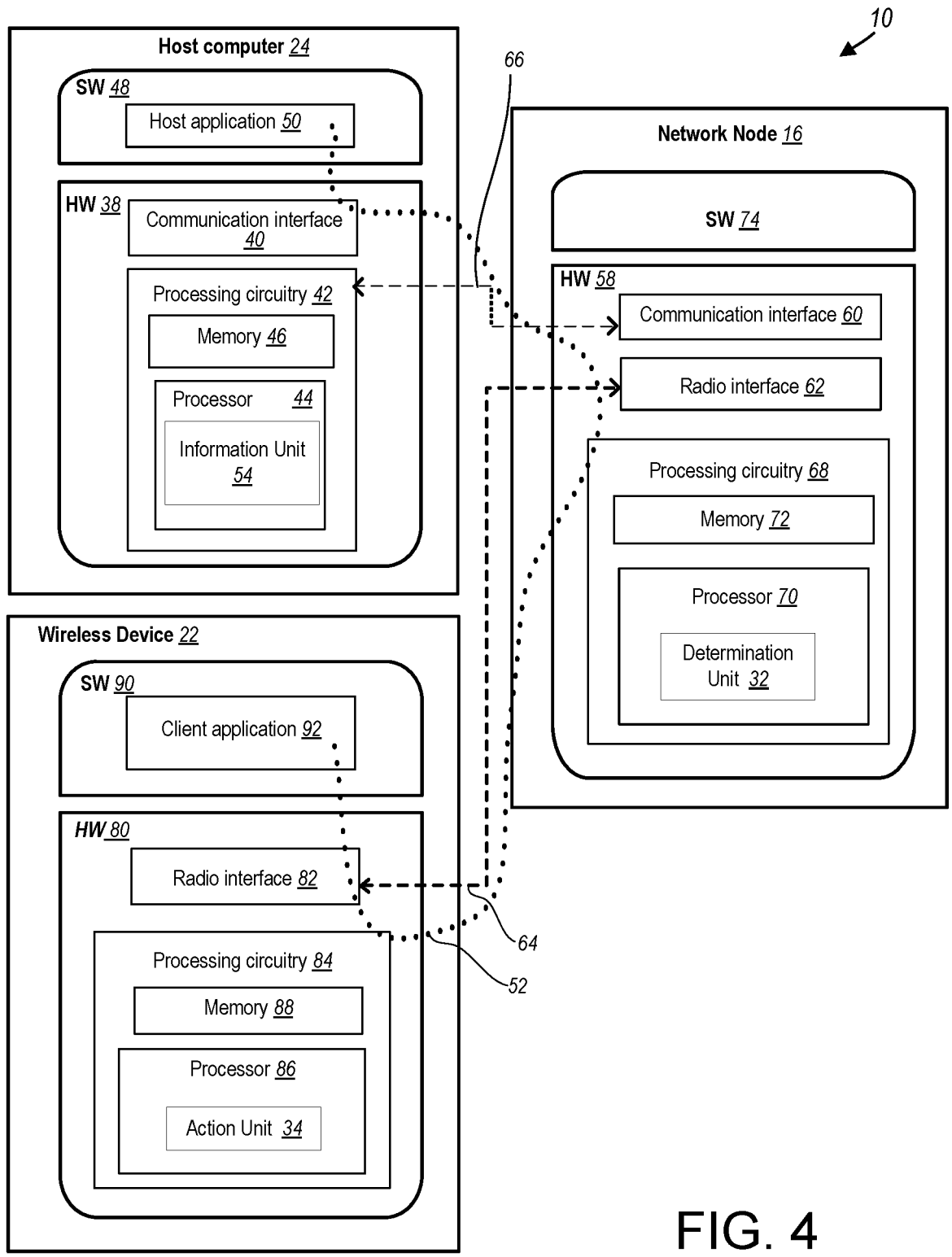
FIG. 4 is a block diagram of a host computer communicating via a network node with a wireless device over an at least partially wireless connection according to some embodiments of the present disclosure.

In some embodiments, the inner workings of the network node 16, wireless device 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the wireless device 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the wireless device 22 and the network node 16 is in accordance with the teachings of the embodiments described throughout this disclosure. One or more of the various embodiments improve the performance of OTT services provided to the wireless device 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and wireless device 22, in response to variations in the measurement results. The measurement procedure and/or the network functionality for reconfiguring the OTT connection 52 may be implemented in the software 48 of the host computer 24 or in the software 90 of the wireless device 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the wireless device 22, and/or preparing/terminating/maintaining/supporting/ending in receipt of a transmission from the wireless device 22.

In some embodiments, the host computer 24 includes processing circuitry 42 and a communication interface 40 that is configured to a communication interface 40 configured to receive user data originating from a transmission from a wireless device 22 to a network node 16. In some embodiments, the wireless device 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as determination unit 32, and action unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an example method implemented in a communication system, such as, for example, the communication system of FIGS. 3 and 4, in accordance with one embodiment. The communication system may include a host computer 24, a network node 16 and a wireless device 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the wireless device 22 (Block S104). In an optional third step, the network node 16 transmits to the wireless device 22 the user data which was carried in the transmission that the host computer 24 initiated, in accordance with the teachings of the embodiments described throughout this disclosure (Block S106). In an optional fourth step, the wireless device 22 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a wireless device 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the wireless device 22 (Block S112). The transmission may pass via the network node 16, in accordance with the teachings of the embodiments described throughout this disclosure. In an optional third step, the wireless device 22 receives the user data carried in the transmission (Block S114).

FIG. 7 is a flowchart illustrating an example method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, the wireless device 22 receives input data provided by the host computer 24 (Block S116). In an optional substep of the first step, the wireless device 22 executes the client application 92, which provides the user data in reaction to the received input data provided by the host computer 24 (Block S118). Additionally or alternatively, in an optional second step, the wireless device 22 provides user data (Block S120). In an optional substep of the second step, the wireless device provides the user data by executing a client application, such as, for example, client application 92 (Block S122). In providing the user data, the executed client application 92 may further consider user input received from the user. Regardless of the specific manner in which the user data was provided, the wireless device 22 may initiate, in an optional third substep, transmission of the user data to the host computer 24 (Block S124). In a fourth step of the method, the host computer 24 receives the user data transmitted from the wireless device 22, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16 and a wireless device 22, which may be those described with reference to FIGS. 3 and 4. In an optional first step of the method, in accordance with the teachings of the embodiments described throughout this disclosure, the network node 16 receives user data from the wireless device 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
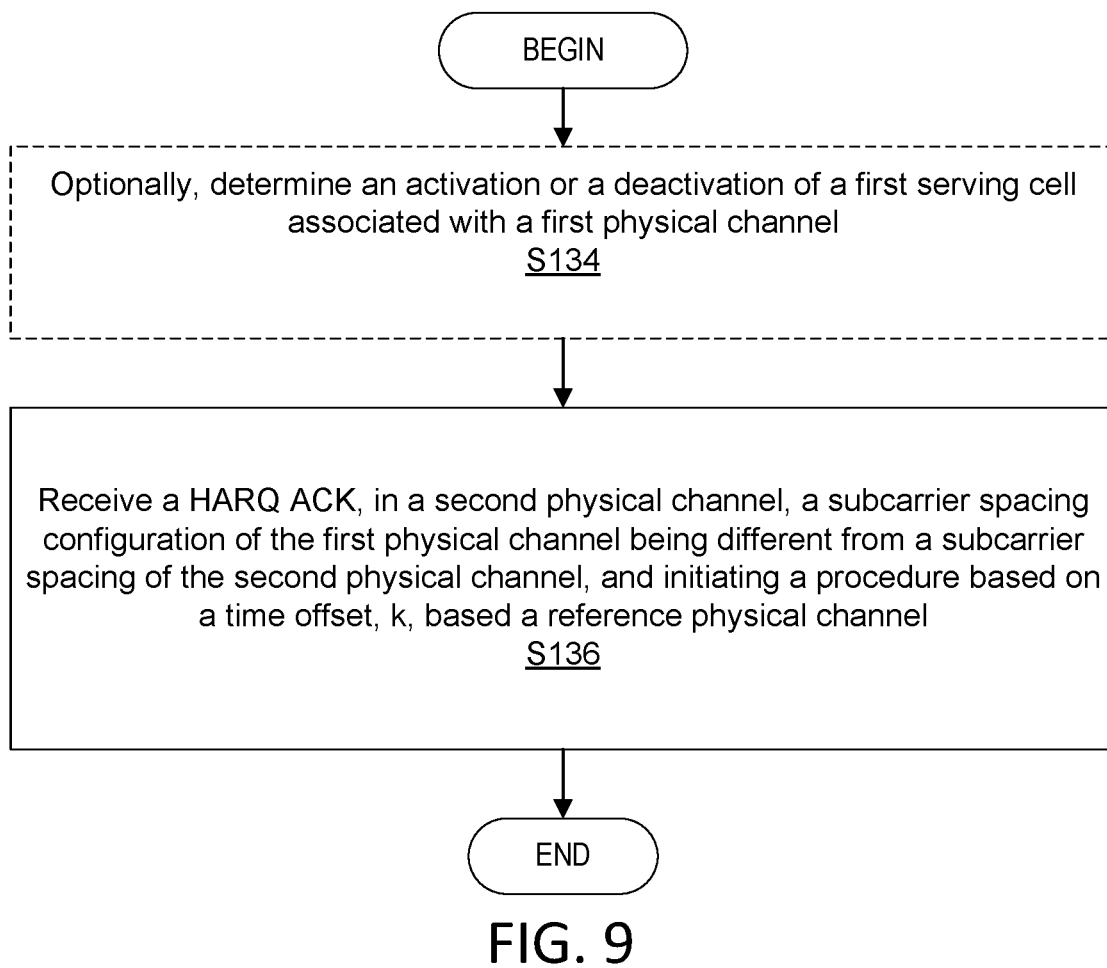
FIG. 9 is a flowchart of an example process in a network node according to some embodiments of the present disclosure.

FIG. 9 is a flowchart of an example process in a network node 16 according to some embodiments of the present disclosure. One or more Blocks and/or functions performed by network node 16 may be performed by one or more elements of network node 16 such as by determination unit 32 in processing circuitry 68, processor 70, communication interface 60, radio interface 62, etc. In some embodiments, the method includes optionally, determining (Block S134), such as by determination unit 32, processing circuitry 68, processor 70, communication interface 60 and/or radio interface 62, an activation or a deactivation of a first serving cell associated with a first physical channel. The method includes receiving (Block S136), such as by determination unit 32, processing circuitry 68, processor 70, communication interface 60 and/or radio interface 62, a corresponding Hybrid Automatic Repeat reQuest, HARQ, acknowledgment, ACK, in a second physical channel, a subcarrier spacing configuration of the first physical channel being different from a subcarrier spacing of the second physical channel, and the activation or the deactivation of the first serving cell initiating a procedure related to the first serving cell, the procedure based at least in part on a time offset, k, the time offset, k, based at least in part on a reference physical channel.

In some embodiments, determining includes sending, such as by determination unit 32, processing circuitry 68, processor 70, communication interface 60 and/or radio interface 62, a command for the activation or the deactivation of the first serving cell in the first physical channel. In some embodiments, the reference physical channel is the second physical channel, and the time offset, k, is based at least in part on the subcarrier spacing configuration of the reference physical channel. In some embodiments, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH. In some embodiments, the time offset, k, is applied after the wireless device 22 receives the command for the activation and the time offset, k, includes a number of slots for a PUCCH transmission after reception of the PDSCH.

In some embodiments, the procedure related to the first serving cell includes at least channel state information, CSI, reporting for the first serving cell in response to the command for activation of the first serving cell. In some embodiments, the method further includes configuring, such as by determination unit 32, processing circuitry 68, processor 70, communication interface 60 and/or radio interface 62, the wireless device 22 with carrier aggregation; and the command for the activation or the deactivation is a medium access control, MAC, command element, CE. In some embodiments, sending the command for the activation or the deactivation of the first serving cell further includes sending, such as by determination unit 32, processing circuitry 68, processor 70, communication interface 60 and/or radio interface 62, the command in a second serving cell different from the first serving cell. In some embodiments, the procedure related to the first serving cell comprises a deactivation procedure and the deactivation procedure includes the wireless device stopping at least one of channel state information, CSI, reporting, physical downlink control channel, PDCCH, monitoring and sounding reference signal, SRS, transmission on the first serving cell in response to the command for deactivation of the first serving cell. In some embodiments, the procedure related to the first serving cell comprises an activation procedure and the activation procedure includes starting at least one of channel state information, CSI, reporting, physical downlink control channel, PDCCH, monitoring and sounding reference signal, SRS, transmission on the first serving cell in response to receiving the command for activation of the first serving cell.

In some embodiments, the procedure related to the first serving cell comprises a deactivation procedure related to the first serving cell, the deactivation procedure related to the first serving cell being based at least in part on two different time offsets for applying serving cell deactivation actions, a first time offset being used if the first serving cell is deactivated using an explicit deactivation command and a second time offset being used if the first serving cell is deactivated upon expiration of a deactivation timer for the first serving cell, the first serving cell being a secondary serving cell. In some embodiments, the first time offset is based at least in part on a subcarrier spacing configuration of the second physical channel; and the second time offset is based at least in part on information related to a physical channel of a scheduling cell of the first serving cell for which the deactivation timer expires.

In some embodiments, the method includes sending, such as via determination unit 32, processing circuitry 68, processor 70, communication interface 60 and/or radio interface 62, a command for activation or deactivation of a first serving cell in a first physical channel. The method includes receiving, such as via determination unit 32, processing circuitry 68, processor 70, communication interface 60 and/or radio interface 62, a corresponding Hybrid Automatic Repeat reQuest, HARQ, acknowledgment, ACK, in a second physical channel, a subcarrier spacing configuration of the first physical channel being different from a subcarrier spacing of the second physical channel, and the command for activation or deactivation of the first serving cell initiating a procedure related to the first serving cell, the procedure based at least in part on a time offset, k, the time offset, k, based at least in part on a reference physical channel.

In some embodiments, the reference physical channel is the second physical channel, and the time offset, k, is based at least in part on the subcarrier spacing configuration of the reference physical channel. In some embodiments, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH. In some embodiments, the time offset, k, is applied after the wireless device receives the command for activation and the time offset, k, includes a number of slots for a PUCCH transmission after reception of the PDSCH.

In some embodiments, the procedure related to the first serving cell includes at least channel state information, CSI, reporting for the first serving cell in response to the command for activation of the first serving cell. In some embodiments, the method further includes configuring, such as via determination unit 32, processing circuitry 68, processor 70, communication interface 60 and/or radio interface 62, the wireless device 22 with carrier aggregation; and the command for activation or deactivation is a medium access control, MAC, command element, CE. In some embodiments, sending the command for activation or deactivation of the first serving cell further includes sending, such as via determination unit 32, processing circuitry 68, processor 70, communication interface 60 and/or radio interface 62, the command in a second serving cell different from the first serving cell.

In some embodiments, the procedure related to the first serving cell comprises a deactivation procedure and the deactivation procedure includes the wireless device stopping at least one of channel state information, CSI, reporting, physical downlink control channel, PDCCH, monitoring and sounding reference signal, SRS, transmission on the first serving cell in response to the command for deactivation of the first serving cell. In some embodiments, the procedure related to the first serving cell comprises an activation procedure and the activation procedure includes starting at least one of channel state information, CSI, reporting, physical downlink control channel, PDCCH, monitoring and sounding reference signal, SRS, transmission on the first serving cell in response to receiving the command for activation of the first serving cell.

In one or more embodiments, network node 16 such as via one or more of processing circuitry 68, processor 70, determination unit 32 communication interface 60 and radio interface 62 is configured to determine to one of activate and deactivate a serving cell of the wireless device, where the one of activation and deactivation is based at least in part on a plurality of numerologies. In one or more embodiments, network node 16 such as via one or more of processing circuitry 68, processor 70, determination unit 32 communication interface 60 and radio interface 62 is configured to optionally indicate the one of activation and deactivation of the serving cell to cause the wireless device 22 to perform one of an activation and deactivation based procedure associated with the serving cell.

Figure 10:
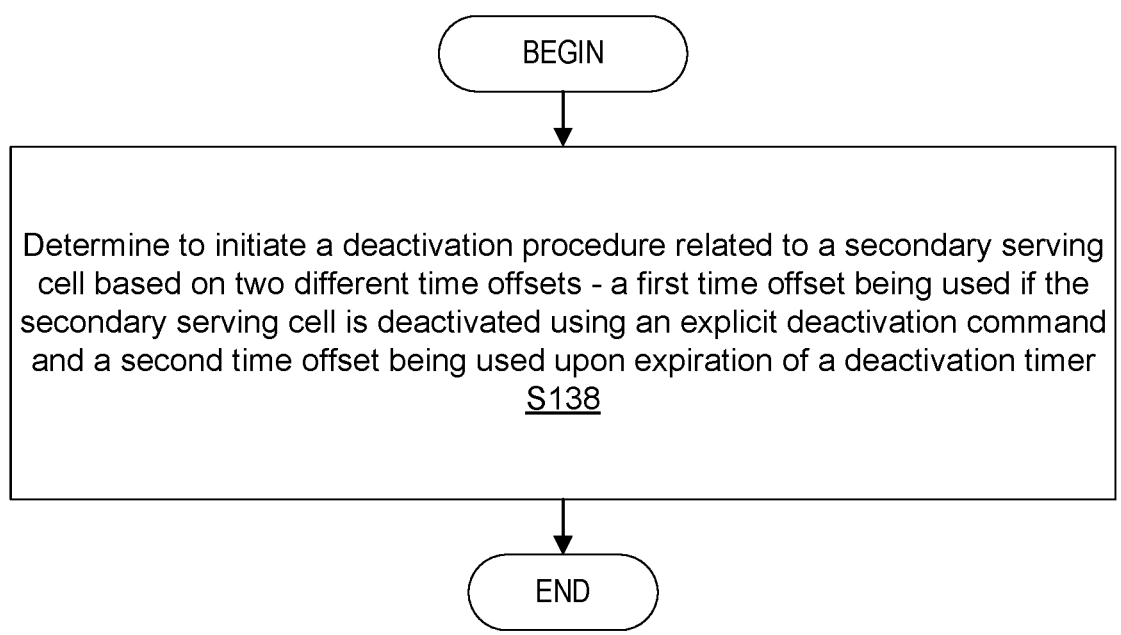
FIG. 10 is a flowchart of yet another example process in a network node according to some embodiments of the present disclosure.

According to one or more embodiments, the activation procedure associate with the serving cell is based at least in part on a slot n+k where k is a time offset and n is a slot number, and the plurality of numerologies include a first numerology of a physical downlink shared channel (PDSCH) containing an activation command and a second numerology of corresponding physical uplink control channel (PUCCH) transmission. According to one or more embodiments, the deactivation procedure associated with the serving cell is based at least in part on two different time offsets for applying serving cell deactivation related actions where a first time offset being used if the serving cell is deactivated using an explicit deactivation command and a second time offset being used if the serving cell is deactivated upon expiration of deactivation timer for the serving cell. FIG. 10 is a flowchart of another example process in a network node 16 according to some embodiments of the present disclosure. One or more Blocks and/or functions performed by network node 16 may be performed by one or more elements of network node 16 such as by determination unit 32 in processing circuitry 68, processor 70, communication interface 60, radio interface 62, etc. In some embodiments, the method includes determining (Block S138), such as via determination unit 32, processing circuitry 68, processor 70, communication interface 60 and/or radio interface 62, to initiate a deactivation procedure related to a secondary serving cell, the deactivation procedure related to the secondary serving cell being based at least in part on two different time offsets for applying serving cell deactivation actions, a first time offset being used if the secondary serving cell is deactivated using an explicit deactivation command and a second time offset being used if the secondary serving cell is deactivated upon expiration of a deactivation timer for the secondary serving cell.

In some embodiments, the first time offset is based at least in part on information related to the explicit deactivation command. In some embodiments, the method further includes sending, such as via determination unit 32, processing circuitry 68, processor 70, communication interface 60 and/or radio interface 62, the explicit deactivation command of the secondary serving cell in a first physical channel; receiving, such as via determination unit 32, processing circuitry 68, processor 70, communication interface 60 and/or radio interface 62, a corresponding Hybrid Automatic Repeat reQuest, HARQ, acknowledgment, ACK, in a second physical channel, a subcarrier spacing configuration of the first physical channel being different from a subcarrier spacing of the second physical channel; and initiating, such as via determination unit 32, processing circuitry 68, processor 70, communication interface 60 and/or radio interface 62, the deactivation procedure related to the secondary serving cell, the deactivation procedure being based at least in part on the first time offset, k, the first time offset, k, being based at least in part on a reference physical channel.

In some embodiments, the reference physical channel is the second physical channel and the time offset is based at least in part on the subcarrier spacing configuration of the reference physical channel. In some embodiments, the second time offset is based at least in part on information related to a physical channel of a scheduling cell of the secondary serving cell for which the deactivation timer expires. In some embodiments, the deactivation procedure includes the wireless device stopping at least one of channel state information, CSI, reporting, physical downlink control channel, PDCCH, monitoring and sounding reference signal, SRS, transmission on the secondary serving cell.

Figure 11:
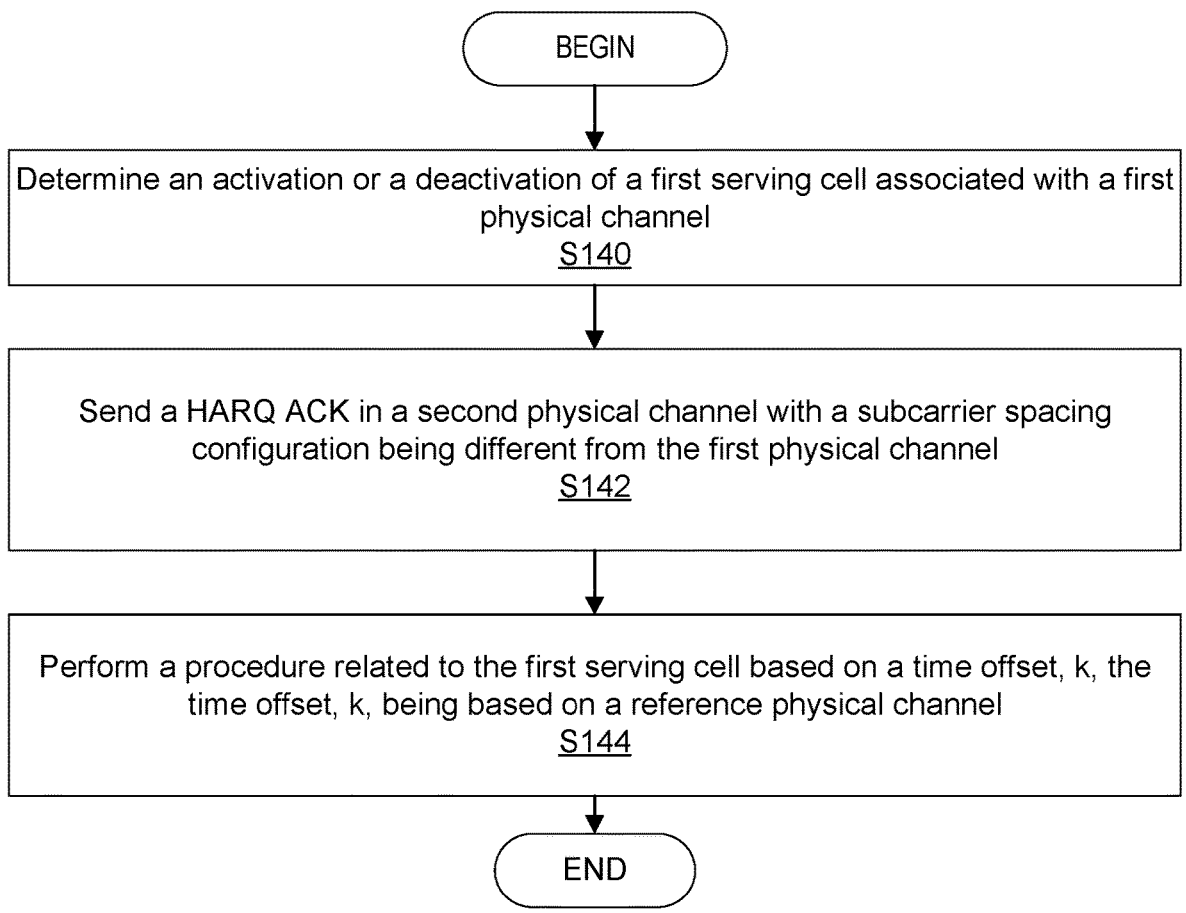
FIG. 11 is a flowchart of an example process in a wireless device according to some embodiments of the present disclosure.

FIG. 11 is a flowchart of an example process in a wireless device 22 according to some embodiments of the present disclosure. One or more Blocks and/or functions performed by wireless device 22 may be performed by one or more elements of wireless device 22 such as by action unit 34 in processing circuitry 84, processor 86, radio interface 82, etc. The method includes determining (Block S140), such as by action unit 34, processing circuitry 84, processor 86 and/or radio interface 82, an activation or a deactivation of a first serving cell associated with a first physical channel. The method includes sending (Block S142), such as by action unit 34, processing circuitry 84, processor 86 and/or radio interface 82, a corresponding Hybrid Automatic Repeat reQuest, HARQ, acknowledgment, ACK, in a second physical channel, a subcarrier spacing configuration of the first physical channel being different from a subcarrier spacing of the second physical channel. The method includes performing (Block S144), such as by action unit 34, processing circuitry 84, processor 86 and/or radio interface 82, a procedure related to the first serving cell based at least in part on a time offset, k, the time offset, k, being based at least in part on a reference physical channel.

In some embodiments, the determining comprises receiving a command from a network node for the activation or the deactivation of the first serving cell in the first physical channel. In some embodiments, the reference physical channel is the second physical channel, and the time offset, k, is based at least in part on the subcarrier spacing configuration of the reference physical channel. In some embodiments, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH. In some embodiments, the time offset, k, is applied after receiving the command for the activation and the time offset, k, includes a number of slots for a PUCCH transmission after reception of the PDSCH.

In some embodiments, performing the procedure related to the first serving cell includes performing, such as by action unit 34, processing circuitry 84, processor 86 and/or radio interface 82, at least channel state information, CSI, reporting for the first serving cell in response to receiving the command for the activation of the first serving cell. In some embodiments, the wireless device 22 is configured with carrier aggregation and the command for the activation or the deactivation is a medium access control, MAC, command element, CE. In some embodiments, receiving the command for the activation or the deactivation of the first serving cell further includes receiving, such as by action unit 34, processing circuitry 84, processor 86 and/or radio interface 82, the command in a second serving cell different from the first serving cell.

In some embodiments, the procedure related to the first serving cell comprises a deactivation procedure and the deactivation procedure includes stopping, such as by action unit 34, processing circuitry 84, processor 86 and/or radio interface 82, at least one of channel state information, CSI, reporting, physical downlink control channel, PDCCH, monitoring and sounding reference signal, SRS, transmission on the first serving cell in response to receiving the command for deactivation of the first serving cell. In some embodiments, the procedure related to the first serving cell comprises an activation procedure and the activation procedure includes starting, such as by action unit 34, processing circuitry 84, processor 86 and/or radio interface 82, at least one of channel state information, CSI, reporting, physical downlink control channel, PDCCH, monitoring and sounding reference signal, SRS, transmission on the first serving cell in response to receiving the command for activation of the first serving cell.

In some embodiments, the determining the deactivation includes a deactivation procedure related to the first serving cell, the deactivation procedure related to the first serving cell being based at least in part on two different time offsets for applying serving cell deactivation actions, a first time offset being used, such as by action unit 34, processing circuitry 84, processor 86 and/or radio interface 82, if the first serving cell is deactivated using an explicit deactivation command and a second time offset being used, such as by action unit 34, processing circuitry 84, processor 86 and/or radio interface 82, if the first serving cell is deactivated upon expiration of a deactivation timer for the first serving cell, the first serving cell being a secondary serving cell. In some embodiments, one or more of: the first time offset is based at least in part on a subcarrier spacing configuration of the second physical channel; and the second time offset is based at least in part on information related to a physical channel of a scheduling cell of the first serving cell for which the deactivation timer expires.

In some embodiments, the method includes receiving, such as via action unit 34, processing circuitry 84, processor 86 and/or radio interface 82, a command for activation or deactivation of a first serving cell in a first physical channel. The method includes sending, such as via action unit 34, processing circuitry 84, processor 86 and/or radio interface 82, a corresponding Hybrid Automatic Repeat reQuest, HARQ, acknowledgment, ACK, in a second physical channel, a subcarrier spacing configuration of the first physical channel being different from a subcarrier spacing of the second physical channel. The method includes performing, such as via action unit 34, processing circuitry 84, processor 86 and/or radio interface 82, a procedure related to the first serving cell based at least in part on a time offset, k, the time offset, k, being based at least in part on a reference physical channel.

In some embodiments, the reference physical channel is the second physical channel, and the time offset, k, is based at least in part on the subcarrier spacing configuration of the reference physical channel. In some embodiments, the first physical channel is a physical downlink shared channel, PDSCH, and the second physical channel is a physical uplink control channel, PUCCH, and the time offset, k, is determined based at least in part on both the subcarrier spacing configuration of the PDSCH and the subcarrier spacing configuration of the PUCCH. In some embodiments, the time offset, k, is applied after receiving the command for activation and the time offset, k, includes a number of slots for a PUCCH transmission after reception of the PDSCH. In some embodiments, performing the procedure related to the first serving cell includes performing, such as via action unit 34, processing circuitry 84, processor 86 and/or radio interface 82, at least channel state information, CSI, reporting for the first serving cell in response to receiving the command for activation of the first serving cell.

In some embodiments, the wireless device 22 is configured with carrier aggregation and the command for activation or deactivation is a medium access control, MAC, command element, CE. In some embodiments, receiving the command for activation or deactivation of the first serving cell further includes receiving, such as via action unit 34, processing circuitry 84, processor 86 and/or radio interface 82, the command in a second serving cell different from the first serving cell. In some embodiments, the procedure related to the first serving cell comprises a deactivation procedure and the deactivation procedure includes stopping at least one of channel state information, CSI, reporting, physical downlink control channel, PDCCH, monitoring and sounding reference signal, SRS, transmission on the first serving cell in response to receiving the command for deactivation of the first serving cell. In some embodiments, the procedure related to the first serving cell comprises an activation procedure and the activation procedure includes starting at least one of channel state information, CSI, reporting, physical downlink control channel, PDCCH, monitoring and sounding reference signal, SRS, transmission on the first serving cell in response to receiving the command for activation of the first serving cell.

In one or more embodiments, wireless device such as via one or more of processing circuitry 84, processor 86, action unit 34 and radio interface 82 is configured to determine to perform one of an activation and deactivation based procedure associated with a serving cell where the one of activation and deactivation being based at least in part on a plurality of numerologies.

According to one or more embodiments, the activation procedure associated with the serving cell is based at least in part on a slot n+k where k is a time offset and n is a slot number, and the plurality of numerologies include a first numerology of a physical downlink shared channel (PDSCH) containing an activation command and a second numerology of corresponding physical uplink control channel (PUCCH) transmission. According to one or more embodiments, the deactivation procedure associated with the serving cell is based at least in part on two different time offsets for applying serving cell deactivation related actions where a first time offset being used if the serving cell is deactivated using an explicit deactivation command and a second time offset being used if the serving cell is deactivated upon expiration of deactivation timer for the serving cell.

Figure 12:
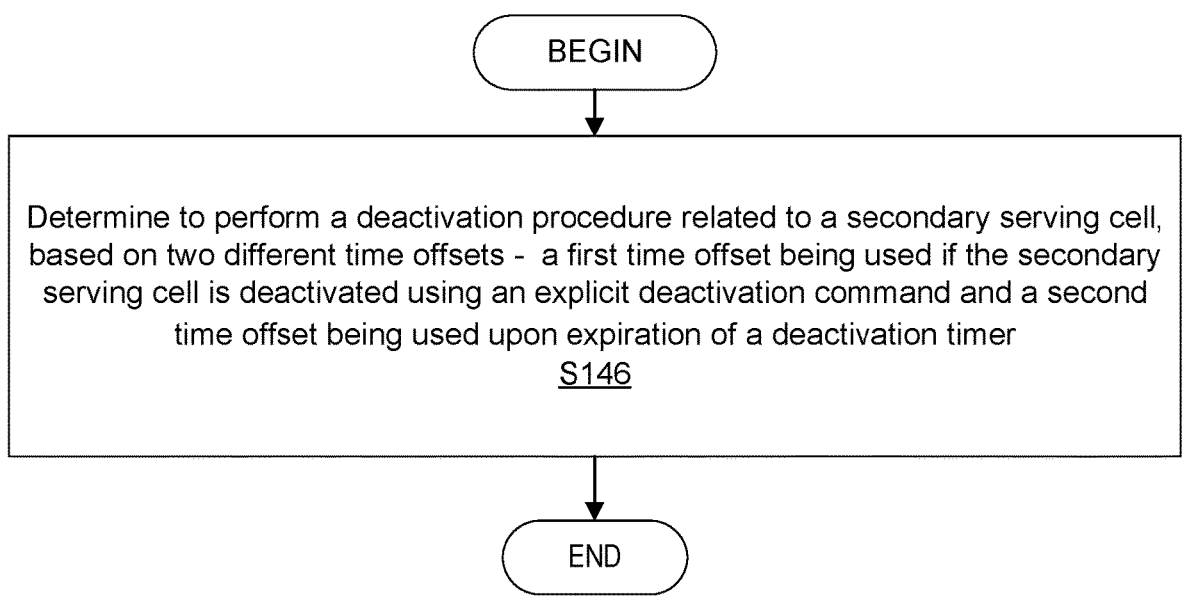
FIG. 12 is a flowchart of an example process in a wireless device according to some embodiments of the present disclosure.

FIG. 12 is a flowchart of an example process in a wireless device 22 according to some embodiments of the present disclosure. One or more Blocks and/or functions performed by wireless device 22 may be performed by one or more elements of wireless device 22 such as by action unit 34 in processing circuitry 84, processor 86, radio interface 82, etc. In some embodiments, the method includes determining (Block S146), such as via action unit 34, processing circuitry 84, processor 86 and/or radio interface 82, to perform a deactivation procedure related to a secondary serving cell, the deactivation procedure related to the secondary serving cell being based at least in part on two different time offsets for applying serving cell deactivation actions, a first time offset being used if the secondary serving cell is deactivated using an explicit deactivation command and a second time offset being used if the secondary serving cell is deactivated upon expiration of a deactivation timer for the secondary serving cell.

In some embodiments, the first time offset is based at least in part on information related to the explicit deactivation command. In some embodiments, the method further includes receiving, such as via action unit 34, processing circuitry 84, processor 86 and/or radio interface 82, the explicit deactivation command of the secondary serving cell in a first physical channel; sending, such as via action unit 34, processing circuitry 84, processor 86 and/or radio interface 82, a corresponding Hybrid Automatic Repeat reQuest, HARQ, acknowledgment, ACK, in a second physical channel, a subcarrier spacing configuration of the first physical channel being different from a subcarrier spacing of the second physical channel; and performing, such as via action unit 34, processing circuitry 84, processor 86 and/or radio interface 82, the deactivation procedure related to the secondary serving cell based at least in part on the first time offset, k, the first time offset, k, being based at least in part on a reference physical channel.

In some embodiments, the reference physical channel is the second physical channel and the time offset is based at least in part on the subcarrier spacing configuration of the reference physical channel. In some embodiments, the second time offset is based at least in part on information related to a physical channel of a scheduling cell of the secondary serving cell for which the deactivation timer expires. In some embodiments, the deactivation procedure includes stopping at least one of channel state information, CSI, reporting, physical downlink control channel, PDCCH, and sounding reference signal, SRS, transmission on the secondary serving cell.

Having described the general process flow of arrangements of the disclosure and having provided examples of hardware and software arrangements for implementing the processes and functions of the disclosure, the sections below provide details and examples of arrangements for serving cell activation and/or deactivation such as when different numerologies are configured and/or a deactivation timer is used, which may be implemented by one or more of network node 16 and wireless device 22.

Some embodiments provide for serving cell activation and/or deactivation such as when different numerologies are configured and/or a deactivation timer is used.

For example, the existing procedure related to Scell activation timing from some wireless communication standards such as, for example, in 3GPP TS 38.214 f50, sec 4.3 is as follows:

When a wireless device 22 receives an activation command (as described in some wireless communication standards such as, for example, in 3GPP TS 38.321) in a PDSCH for a secondary cell in slot n, the wireless device 22 applies the corresponding actions in, as described in some wireless communication standards such as, for example, in 3GPP TS 38.321, no later than the minimum required time period defined in some wireless communication standards such as, for example, in 3GPP TS 38.133 and no earlier than slot n+k, except for the following:

- the actions related to CSI reporting on a serving cell that is active in slot n+k;
- the actions related to the sCellDeactivationTimer associated with the secondary cell as described in some wireless communication standards such as, for example, in 3GPP TS 38.321, that the wireless device 22 applies in slot n+k;
- the actions related to CSI reporting on a serving cell which is not active in slot n+k that the wireless device 22 applies in the earliest slot after n+k in which the serving cell is active.

The value of k is $k_1 + 3 \cdot N_{slot}^{subframe,\mu} + 1$ where k is a number of slots for a PUCCH transmission with HARQ-ACK information for the PDSCH reception and is indicated by the PDSCH-to-HARQ-timing-indicator field in the downlink control information (DCI) format scheduling the PDSCH reception, as described in some wireless communication standards such as, for example, in Subclause 9.2.3, and $N_{slot}^{subframe,\mu}$ is a number of slots per subframe for the SCS configuration μ of the PUCCH transmission.

If a wireless device 22 receives a deactivation command, as described in some wireless communication standards such as, for example, in 3GPP TS 38.321, for a secondary cell or the sCellDeactivationTimer associated with the secondary cell expires in slot n, the wireless device 22 applies the corresponding actions in 3GPP TS 38.321 no later than the minimum required time period defined in 3GPP TS 38.133, except for the actions related to CSI reporting on a serving cell which is active which the wireless device 22 applies in slot n+k.

The above procedure related to Scell activation timing suffers from at least one of the problems described herein.

Some embodiments of the instant disclosure may solve at least a portion of the problems described herein by providing one or more processes and/or configurations for Scell activation and/or deactivation as described herein. In one or more embodiments described herein, the deactivation and/or activation command is determined by the network node 16 such as via processing circuitry 68 and/or determination unit 32, and indicated, i.e., provided, to the wireless device 22. As used herein, the terms "action" and "procedure" may be used interchangeably.

Some embodiments related to Scell activation are described below.

In one embodiment, the wireless device 22 is configured for carrier aggregation (CA). The wireless device 22 is configured with one or more secondary serving cells (Scells) in addition to its Primary serving cell (Pcell). The wireless device 22 receives, via radio interface 82, an activation command for activation of a first serving cell (e.g. SCell1) of the one or more Scells. The activation command is received in slot n of a second serving cell (e.g., Pcell/PScell/PUCCH-Scell or another SCell say Scell2) using a first physical channel (e.g., PDSCH or PDCCH). The wireless device 22 transmits, via radio interface 82, HARQ-ACK in response to receiving the activation command using a second physical channel (e.g., PUCCH or PUSCH). The wireless device 22 starts and/or initiates, via processing circuitry 84 and/or action unit 34, CSI reporting for Scell1 from slot n+k where k is determined based on sub-carrier spacing configuration of the first physical channel (SCS1) and sub-carrier spacing configuration of the second physical channel (SCS2). The wireless device 22 may start performing, via processing circuitry 84 and/or action unit 34, other activation related actions (e.g., PDCCH monitoring for Rein, SRS/PUCCH transmission on Scell1) starting from slot n+k.

In one example related to the above embodiment, the first and second physical channels can be on the same serving cell (e.g., Pcell, PScell, PUCCH-Scell), i.e., served by the same network node 16. In another example, the first physical channel can be on different serving cells (e.g., first physical channel PDSCH received on Scell2 and second physical channel PUCCH transmitted on Pcell).

In one example, the activation command is received in slot n where the first physical channel is PDSCH and second physical channel is PUCCH and the time offset k is given by:

$$k=(k_1+3\cdot N_{slot}^{subframe,\mu}+1)\cdot 2^{\mu_{PDSCH}-\mu},$$

where $k_1$ is a number of slots for PUCCH transmission with HARQ-ACK information for the PDSCH reception and is indicated by the PDSCH-to-HARQ-timing-indicator field in a DCI format scheduling the PDSCH reception (e.g., as described in existing wireless communications standards such as, for example, in Subclause 9.2.3 of 3GPP TS 38.213) and $N_{slot}^{subframe,\mu}$ is a number of slots per subframe for the SCS configuration μ of the PUCCH transmission and $\mu_{PDSCH}$ is the SCS configuration of the PDSCH transmission.

In response to receiving the activation command, the wireless device 22 applies, via processing circuitry 84 and/or action unit 34, a corresponding first set of actions such as those action(s) described in wireless communication standards such as, for example, in 3GPP TS 38.321 no later than a minimum required time period (e.g. as described in wireless communication standards such as, for example, in 3GPP TS 38.133) and no earlier than slot n+k and:
  applies/performs, via processing circuitry 84 and/or action unit 34, the actions related to CSI reporting (e.g., report CSI using a payload size that includes bits) on a serving cell that is active in slot n+k;
  applies/performs, via processing circuitry 84 and/or action unit 34, the actions related to the sCellDeactivationTimer (e.g., starting the sCellDeactivationTimer) associated with first serving cell (e.g., Scell1) in slot n+k;

The time offset k can be approximated to an integer number. In one example, the time offset k is given by $k=\text{Ceil}((k_1+3\cdot N_{slot}^{subframe,k=\mu}+1)\cdot 2^{\mu_{PDSCH}-\mu})$. In another example, the time offset k is given by $k=\text{floor}((k_1+3\cdot N_{slot}^{subframe,\mu}+1)\cdot 2^{\mu_{PDSCH}-\mu})$. In yet another example, the time offset k is given by $k=\text{round}((k_1+3\cdot N_{slot}^{subframe,\mu}+1)\cdot 2^{\mu_{PDSCH}-\mu})$.

In another example, the activation command is received in slot n where the first physical channel is PDSCH and second physical channel is PUCCH and the time offset k is given by:

$$k=(k_1+A\cdot N_{slot}^{subframe,\mu}+B)\cdot 2^{\mu_{PDSCH}-\mu},$$

where $k_1$ is a number of slots for PUCCH transmission with HARQ-ACK information for the PDSCH reception and is indicated by the PDSCH-to-HARQ-timing-indicator field in a DCI format scheduling the PDSCH reception (e.g., as described existing wireless communication standards such as, for example, in Subclause 9.2.3 of 3GPP TS 38.213) and $N_{slot}^{subframe,\mu}$ is a number of slots per subframe for the SCS configuration μ of the PUCCH transmission and $\mu_{PDSCH}$ is the SCS configuration of the PDSCH transmission. "A" can be a predefined number/quantity, e.g., can be predefined as a value of 3 or 4, and B can be predefined number/quantity, such as 0 or 1.

In response to receiving the activation command, the wireless device 22 applies, via processing circuitry 84 and/or action unit 34, the corresponding a first set of actions (e.g., action(s) described in wireless communication standards such as, for example, in 3GPP TS 38.321] no later than a minimum required time period (e.g., minimum required time period described in wireless communication standards such as, for example, in 3GPP TS 38.133) and no earlier than slot n+k and:
  applies/performs, via processing circuitry 84 and/or action unit 34, the actions related to CSI reporting (e.g., report CSI using a payload size that includes bits) on a serving cell that is active in slot n+k;
  applies/performs, via processing circuitry 84 and/or action unit 34, the actions related to the sCellDeactivationTimer (e.g., starting the sCellDeactivationTimer) associated with first serving cell (e.g., Scell1) in slot n+k;

The time offset k can be approximated to an integer number. In one example, the time offset k is given by $k=\text{Ceil}((k_1+A \cdot N_{slot}^{subframe,\mu}+B) \cdot 2^{\mu_{PDSCH}-\mu})$. In another example, the time offset k is given by $k=\text{floor}((k_1+A \cdot N_{slot}^{subframe,\mu}+B) \cdot 2^{\mu_{PDSCH}-\mu})$. In yet another example, the time offset k is given by $k=\text{round}((k_1+A \cdot N_{slot}^{subframe,\mu}+B) \cdot 2^{\mu_{PDSCH}-\mu})$.

In an example, the first physical channel is PDSCH, and the second physical channel is PUCCH or a PUSCH, and the time offset k is based on one or more of the following: a number of slots for second physical transmission with HARQ-ACK information for the first physical channel reception as indicated by a timing-indicator field in a DCI format scheduling the first physical channel reception, a number of slots per subframe for a SCS configuration of a reference physical channel, a scaling factor that is determined based on a numerology of the first physical channel and a numerology of the second physical channel. In a further example, the reference physical channel is the first physical channel. In another example, the reference physical channel is a second physical channel.

In another example, the first physical channel is PDCCH, and the second physical channel is PUCCH or a PUSCH, and the time offset k is based on one or more of the following: a number of slots for second physical transmission with HARQ-ACK information for the first physical channel reception as indicated by a timing-indicator field in a DCI format decoded in the first physical channel reception, a number of slots per subframe for a reference SCS configuration of a reference physical channel, a scaling factor that is determined based on a numerology of the first physical channel and a numerology of the second physical channel. In a further example, the reference physical channel is the first physical channel. In another example, the reference physical channel is a second physical channel.

Some embodiments related to Scell deactivation are described below.

In one embodiment, the wireless device 22 is configured for carrier aggregation (CA). The wireless device 22 is configured with one or more secondary serving cells (Scells) in addition to its Primary serving cell (Pcell). When wireless device 22 receives a deactivation command of a first serving cell (e.g., SCell1) in slot n of a second serving cell using a first physical channel (e.g., PDSCH or PDCCH) and the wireless device 22 transmits HARQ-ACK in response to receiving, via radio interface 82, the deactivation command using a second physical channel (e.g., PUCCH or PUSCH), the wireless device 22 applies, via processing circuitry 84 and/or action unit 34, an action related to CSI reporting for Scell1 from slot n+k, where k is a time offset given by m1 where m1 is a first value, and when the sCell Deactivation Timer associated with the secondary cell expires in slot n, the wireless device 22 applies, via processing circuitry 84 and/or action unit 34, an action related to CSI reporting for Scell1 from slot n+k, where k is a time offset given by m2 where m2 is a second value. The first and second values are distinct. The wireless device 22 may start performing, via processing circuitry 84 and/or action unit 34, other deactivation related actions (e.g., stop PDCCH monitoring for Scell1, stop SRS/PUCCH transmission on Scell1) starting from slot n+m1 when the wireless device 22 receives, via radio interface 82, a deactivation command and starting from slot n+m2 when the sCell Deactivation Timer expires. The first value (m1) can be determined based at least in part on sub-carrier spacing configuration of the first physical channel (SCS1) and a sub-carrier spacing configuration of a second physical channel (SCS2). In one or more embodiments described herein, Scell deactivation may not deactivate the Scell, itself, as the Scell remains active to serve one or more other wireless devices 22. In one or more embodiments described herein, Scell activation may not activate the Scell, itself, as the Scell may be serving other wireless devices 22 and/or be ready to serve the other wireless devices 22.

In one example related to the above embodiment, the first and second physical channels can be on the same serving cell (e.g., Pcell, PScell, PUCCH-Scell). In another example, the first physical channel can be on different serving cells (e.g., first physical channel PDSCH received on Scell2 and second physical channel PUCCH transmitted on Pcell).

Some examples for time offset k for the case of deactivation command reception are described next.

In an example, the deactivation command is received in slot n where the first physical channel is PDSCH and second physical channel is PUCCH and the time offset k is given by $k=m1=((k_1+3 \cdot N_{slot}^{subframe,\mu}+1) \cdot 2^{\mu_{PDSCH}-\mu}$ where $k_1$ is a number of slots for PUCCH transmission with HARQ-ACK information for the PDSCH reception and is indicated by the PDSCH-to-HARQ-timing-indicator field in a DCI format scheduling the PDSCH reception (e.g., as described in wireless communication standards such as, for example, in Subclause 9.2.3 of 3GPP TS 38.213) and $N_{slot}^{subframe,\mu}$ is a number of slots per subframe for the SCS configuration μ of the PUCCH transmission and $\mu_{PDSCH}$ is the SCS configuration of the PDSCH transmission.

The time offset k (or m1) can be approximated to an integer number. In one example, the time offset k is given by $k=\text{Ceil}((k_1+3 \cdot N_{slot}^{subframe,k=\mu}+1) \cdot 2^{\mu_{PDSCH}-\mu}$. In another example, the time offset k is given by $k=\text{floor}((k_1+3 \cdot N_{slot}^{subframe,\mu}+1) \cdot 2^{\mu_{PDSCH}-\mu}$. In yet another example, the time offset k is given by $k=\text{round}((k_1+3 \cdot N_{slot}^{subframe,\mu}+1) \cdot 2^{\mu_{PDSCH}-\mu}$.

In an example, the deactivation command is received in slot n and first physical channel is PDSCH and second physical channel is PUCCH and the time offset k is given by $k=m1=(k_1+3 \cdot N_{slot}^{subframe,\mu}+1) \cdot 2^{\mu_{PDSCH}-\mu}$ where $k_1$ is a number of slots for PUCCH transmission with HARQ-ACK information for the PDSCH reception and is indicated by the PDSCH-to-HARQ-timing-indicator field in a DCI format scheduling the PDSCH reception (e.g., as described in wireless communication standards such as, for example, Subclause 9.2.3 of 3GPP TS 38.213) and $N_{slot}^{subframe,\mu}$ is a number of slots per subframe for the SCS configuration μ of the PUCCH transmission and $\mu_{PDSCH}$ is the SCS configuration of the PDSCH transmission. "A" can be predefined, e.g., can be preconfigured with values such as 3 or 4, and "B" can be a predefined number such as 0 or 1, for example.

The time offset k (or m1) can be approximated to an integer number. In one example, the time offset k is given by $k=\text{Ceil}((k_1+A \cdot N_{slot}^{subframe,\mu}+B) \cdot 2^{\mu_{PDSCH}-\mu})$. In another example, the time offset k is given by $k=\text{floor}((k_1+A \cdot N_{slot}^{subframe,\mu}+B) \cdot 2^{\mu_{PDSCH}-\mu})$. In yet another example, the time offset k is given by $k=\text{round}((k_1+A \cdot N_{slot}^{subframe,\mu}+B) \cdot 2^{\mu_{PDSCH}-\mu})$.

In an example, the first physical channel is PDSCH, and the second physical channel is PUCCH or a PUSCH, and the time offset k is based on one or more of the following: a number of slots for second physical transmission with HARQ-ACK information for the first physical channel reception as indicated by a timing-indicator field in a DCI format scheduling the first physical channel reception, a number of slots per subframe for a SCS configuration of a reference physical channel, a scaling factor that is determined based at least in part on a numerology of the first physical channel and a numerology of the second physical channel. In a further example, the reference physical channel is the first physical channel. In another example, the reference physical channel is a second physical channel.

In an example, the first physical channel is a PDCCH, and the second physical channel is PUCCH or a PUSCH, and the time offset k is based on one or more of the following: a number of slots for second physical transmission with HARQ-ACK information for the first physical channel reception as indicated by a timing-indicator field in a DCI format decoded in the first physical channel reception, a number of slots per subframe for a reference SCS configuration of a reference physical channel, a scaling factor that is determined based at least in part on a numerology of the first physical channel and a numerology of the second physical channel. In a further example, the reference physical channel is the first physical channel. In another example, the reference physical channel is a second physical channel.

Some examples for time offset k for the case of deactivation timer expiration are described next.

In an example, when the deactivation timer expires in slot n, the time offset k can be m2=(A·$N_{slot}^{subframe,\mu_{PxSCH}}$+B), where $N_{slot}^{subframe,\mu_{PxSCH}}$ is a number of slots per subframe for the SCS configuration $\mu_{PxSCH}$ of a PxCCH. The PxCCH can be the PDCCH of the scheduling cell for the secondary cell. "A" can be predefined, e.g., can take values 3 or 4, and "B" can be predefined number, such as 0 or 1. In one or more embodiments, the wireless device 22, via processing circuitry 84 and/or action unit 34, can provide the deactivation timer.

The time offset k (or m2) can be approximated to an integer number. In one example, the time offset k is given by k=Ceil(($k_1$+A·$N_{slot}^{subframe,\mu}$+B)·$2^{\mu_{PDSCH}-\mu}$). In another example, the time offset k is given by k=floor(($k_1$+A·$N_{slot}^{subframe,\mu}$+B)·$2^{\mu_{PDSCH}-\mu}$). In yet another example, the time offset k is given by k=round (($k_1$+A·$N_{slot}^{subframe,\mu}$+B)·$2^{\mu_{PDSCH}-\mu}$).

An example of a process for deactivation can be described below.

If a wireless device 22 receives, via radio interface 82, a deactivation command (e.g., as described in wireless communication standards such as, for example, in 3GPP TS 38.321) for a secondary cell in slot n, the wireless device 22 applies, via processing circuitry 84 and/or action unit 34, one or more of corresponding actions (e.g., action described in wireless communication standards such as, for example, 3GPP TS 38.321) no later than the minimum required time period defined in wireless communication standards such as, for example, 3GPP TS 38.133, except for the actions related to CSI reporting on a serving cell which is active which the wireless device 22 applies in slot n+k.

If the sCellDeactivationTimer associated with the secondary cell expires in slot n, the wireless device 22 applies, via processing circuitry 84 and/or action unit 34, the corresponding actions (e.g., action described in wireless communication standards such as, for example, 3GPP TS 38.321) no later than the minimum required time period defined in wireless communication standards such as, for example, in 3GPP TS 38.133, except for the actions related to CSI reporting on a serving cell which is active in which the wireless device 22 applies, via processing circuitry 84 and/or action unit 34, in slot n+k where k=4·$N_{slot}^{subframe,\mu_{PDCCH}}$ and $\mu_{PDCCH}$ is the SCS configuration of the PDCCH of the scheduling cell for the secondary cell.

An example description of improved/modified procedure describing Scell activation timing considering the above discussion is shown below:

Modified Procedure:
<begin, e.g., of TP for subclause 4.3 of 3GPP TS 38.213 f50>
Timing for Secondary Cell Activation/Deactivation When a wireless device 22 receives an activation command (e.g., command as described in wireless communication standards such as, for example, in 3GPP TS 38.321) in a PDSCH for a secondary cell in slot n, the wireless device 22 applies the corresponding actions (e.g., action as described in wireless communication standards such as, for example, 3GPP TS 38.321) no later than the minimum required time period defined in wireless communication standards such as, for example, in 3GPP TS 38.133 and no earlier than slot n+k, except for the following:
  the actions related to CSI reporting on a serving cell that is active in slot n+k;
  the actions related to the sCellDeactivationTimer associated with the secondary cell as described wireless communication standards such as, for example, 3GPP TS 38.321 that the wireless device 22 applies in slot n+k;
  the actions related to CSI reporting on a serving cell which is not active in slot n+k that the wireless device 22 applies in the earliest slot after n+k in which the serving cell is active.

The value of k is $\lceil (k_1+3 \cdot N_{slot}^{subframe,\mu}+1) \cdot 2^{\mu_{PDSCH}-\mu} \rceil$ where $k_1$ is a number of slots for a PUCCH transmission with HARQ-ACK information for the PDSCH reception and is indicated by the PDSCH-to-HARQ-timing-indicator field in the DCI format scheduling the PDSCH reception as described in wireless communication standards such as, for example, Subclause 9.2.3 and $N_{slot}^{subframe,\mu}$ is a number of slots per subframe for the SCS configuration μ of the PUCCH transmission and $\mu_{PDSCH}$ is the SCS configuration of the PDSCH.

If a wireless device 22 receives a deactivation command (e.g., command as described in wireless communication standards such as, for example, in 3GPP TS 38.321) for a secondary cell in slot n, the wireless device 22 applies the corresponding actions (e.g., action described in wireless communication standards such as, for example, 3GPP TS 38.321) no later than the minimum required time period defined wireless communication standards such as, for example, 3GPP TS 38.133), except for the actions related to CSI reporting on a serving cell which is active in which the wireless device 22 applies in slot n+k.

If the sCellDeactivationTimer associated with the secondary cell expires in slot n, the wireless device 22 applies the corresponding actions described in wireless communication standards such as, for example, 3GPP TS 38.321 no later than the minimum required time period defined in wireless communication standards such as, for example, 3GPP TS 38.133, except for the actions related to CSI reporting on a serving cell which is active which the wireless device 22 applies in slot n+k where k=4·$N_{slot}^{subframe,\mu_{PDCCH}}$ and $\mu_{PDCCH}$ is the SCS configuration of the PDCCH of the scheduling cell for the secondary cell.
<end of TP>, i.e., of modified procedure.

Therefore, the instant disclosure provides several advantages over existing systems as described herein. For CA, upon reception of a Scell activation command (e.g., in slot n), determining a time offset (k) after which certain activation related activation related actions are performed, where the time offset is determined based on SCS configuration (SCS1) of the physical channel (e.g. PDSCH) on which the activation command is received and the SCS configuration (SCS2) of the physical channel on which a HARQ-ACK response to the activation command is sent (e.g. PUCCH).

In a more specific example, a scaling factor $2^{\mu_{PDSCH}-\mu}$ is used for determining time offset (k), to normalize the impact of different numerology between SCS1 (corresponding to $\mu_{PDSCH}$) and SCS2 (corresponding to $\mu$). This allows term n+k to be correctly and/or more accurately be defined regardless of numerology of PDSCH containing activation command ($\mu_{PDSCH}$) and numerology of corresponding PUCCH transmission ($\mu$).

For CA, using two different time offsets for applying Scell deactivation related actions where first a time offset is used if Scell is deactivated using an explicit deactivation command and a second time offset is used if the Scell is deactivated upon expiration of deactivation timer for the Scell.

In a more specific example, the first time offset is based on information related to deactivation command (e.g., PDSCH to HARQ-ACK delay, SCS configurations of the PDSCH carrying the deactivation command and corresponding HARQ-ACK) while the second time offset is based on information related to PDCCH of the scheduling cell of the Scell for which the Scell deactivation timer expires.

In some embodiments, which may be performed by network node 16 and/or wireless device 22, if the sCellDeactivationTimer associated with the secondary cell expires in slot n, the wireless device 22 applies the corresponding actions in [3GPP TS 38.321] no later than the minimum requirement defined in [TS 38.133], except for the actions related to CSI reporting on a serving cell which is active which the wireless device 22 applies in, for example, slot n+k where e.g., $k=4\cdot N_{slot}^{subframe,\mu_{PDCCH}}$ and $\mu_{PDCCH}$ is the subcarrier spacing (SCS) configuration of the PDCCH of the scheduling cell for the secondary cell.

Some examples may include one or more of the following:

Example A1. A network node configured to communicate with a wireless device, the network node configured to, and/or comprising a radio interface and/or comprising processing circuitry configured to:

determine to one of activate and deactivate a serving cell of the wireless device, the one of activation and deactivation being based at least in part on a plurality of numerologies; and optionally indicate the one of activation and deactivation of the serving cell to cause the wireless device to perform one of an activation and deactivation based procedure associated with the serving cell.

Example A2. The network node of Example A1, wherein the activation procedure associated with the serving cell is based at least in part on a slot n+k, k being a time offset and n being a slot number; and the plurality of numerologies including a first numerology of a physical downlink shared channel (PDSCH) containing an activation command and a second numerology of corresponding physical uplink control channel (PUCCH) transmission.

Example A3. The network node of Example A1, wherein the deactivation procedure associated with the serving cell is based at least in part on two different time offsets for applying serving cell deactivation related actions, a first time offset being used if the serving cell is deactivated using an explicit deactivation command and a second time offset being used if the serving cell is deactivated upon expiration of deactivation timer for the serving cell.

Example B1. A method implemented in a network node, the method comprising:

determining to one of activate and deactivate a serving cell of the wireless device, the one of activation and deactivation being based at least in part on a plurality of numerologies; and optionally indicating the one of activation and deactivation of the serving cell to cause the wireless device to perform one of an activation and deactivation based procedure associated with the serving cell.

Example B2. The method of Example B1, wherein the activation procedure associated with the serving cell is based at least in part on a slot n+k, k being a time offset and n being a slot number; and the plurality of numerologies including a first numerology of a physical downlink shared channel (PDSCH) containing an activation command and a second numerology of corresponding physical uplink control channel (PUCCH) transmission.

Example B3. The method of Example B1, wherein the deactivation procedure associated with the serving cell is based at least in part on two different time offsets for applying serving cell deactivation related actions, a first time offset being used if the serving cell is deactivated using an explicit deactivation command and a second time offset being used if the serving cell is deactivated upon expiration of deactivation timer for the serving cell.

Example C1. A wireless device configured to communicate with a network node, the wireless device configured to, and/or comprising a radio interface and/or processing circuitry configured to:

determine to perform one of an activation and deactivation based procedure associated with a serving cell, the one of activation and deactivation being based at least in part on a plurality of numerologies.

Example C2. The wireless device of Example C1, wherein the activation procedure associated with the serving cell is based at least in part on a slot n+k, k being a time offset and n being a slot number; and the plurality of numerologies including a first numerology of a physical downlink shared channel (PDSCH) containing an activation command and a second numerology of corresponding physical uplink control channel (PUCCH) transmission.

Example C3. The wireless device of Example C1, wherein the deactivation procedure associated with the serving cell is based at least in part on two different time offsets for applying serving cell deactivation related actions, a first time offset being used if the serving cell is deactivated using an explicit deactivation command and a second time offset being used if the serving cell is deactivated upon expiration of deactivation timer for the serving cell.

Example D1. A method implemented in a wireless device, the method comprising determining to perform one of an activation and deactivation based procedure associated with a serving cell, the one of activation and deactivation being based at least in part on a plurality of numerologies.

Example D2. The method of Example D1, wherein the activation procedure associated with the serving cell is based at least in part on a slot n+k, k being a time offset and n being a slot number; and the plurality of numerologies including a first numerology of a physical downlink shared channel (PDSCH) containing an activation command and a second numerology of corresponding physical uplink control channel (PUCCH) transmission.

Example D3. The method of Example D1, wherein deactivation procedure associated with the serving cell is based at least in part on two different time offsets for applying serving cell deactivation related actions, a first time offset being used if the serving cell is deactivated using an explicit deactivation command and a second time offset being used if the serving cell is deactivated upon expiration of deactivation timer for the serving cell.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| | |
|---|---|
| CC | Component carrier |
| CSI | Channel State Information |
| eMBB | enhanced Mobile BroadBand |
| LTE | Long Term Evolution |
| NR | Next Radio |
| PDCCH | Physical Downlink Control Channel |
| PUCCH | Physical Uplink Control Channel |
| PDSCH | Physical Downlink Shared Channel |
| PUSCH | Physical Uplink Shared Channel |
| SCS | Subcarrier spacing |
| Scell | Secondary cell |
| UE | User Equipment |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method implemented by a wireless device, the method comprising:
   determining a deactivation of a first serving cell associated with a first physical channel, the deactivation being based on one of two different time offsets for applying serving cell deactivation actions for the first serving cell:
   a first time offset being used when the first serving cell is deactivated using an explicit deactivation command; and
   a second time offset being used when the first serving cell being is deactivated upon expiration of a deactivation timer, the first serving cell being a secondary serving cell;

sending, when the first serving cell is deactivated using an explicit deactivation command, a corresponding Hybrid Automatic Repeat reQuest, HARQ, acknowledgment, ACK, in a second physical channel, a subcarrier spacing configuration of the first physical channel being different from a subcarrier spacing configuration of the second physical channel; and performing a procedure related to the first serving cell based at least in part on the first time offset when the cell is deactivated using the explicit deactivation command and the second time offset when the cell is deactivated upon expiration of the deactivation timer, the first time offset being based at least in part on the subcarrier spacing configuration of the second physical channel, and the second time offset being based at least in part on information related to a physical channel of a scheduling cell of the first serving cell for which the deactivation timer expires.

2. The method of claim 1, wherein the first physical channel is a physical downlink shared channel, PDSCH, and the second physical channel is a physical uplink control channel, PUCCH.

3. The method of claim 1, wherein the procedure related to the first serving cell comprises stopping at least one of channel state information, CSI, reporting, physical downlink control channel, PDCCH, monitoring and sounding reference signal, SRS, transmission on the first serving cell in response to receiving the command for deactivation of the first serving cell.

4. A method implemented in a network node configured to communicate with a wireless device, the method comprising:
determining a deactivation of a first serving cell associated with a first physical channel, the deactivation being based on one of two different time offsets for applying serving cell deactivation actions for the first serving cell:
a first time offset being used when the first serving cell is deactivated using an explicit deactivation command; and
a second time offset being used when the first serving cell is deactivated upon expiration of a deactivation timer, the first serving cell being a secondary serving cell; and
receiving, when the first serving cell is deactivated using an explicit deactivation command, a corresponding Hybrid Automatic Repeat reQuest, HARQ, acknowledgment, ACK, in a second physical channel, a subcarrier spacing configuration of the first physical channel being different from a subcarrier spacing configuration of the second physical channel, and the deactivation of the first serving cell initiating a procedure related to the first serving cell, the procedure being based at least in part on the first time offset when the cell is deactivated using the explicit deactivation command and the second time offset when the cell is deactivated upon expiration of the deactivation timer, the first time offset being based at least in part on the subcarrier spacing configuration of the second physical channel, and the second time offset being based at least in part on information related to a physical channel of a scheduling cell of the first serving cell for which the deactivation timer expires.

5. The method of claim 4, wherein the first physical channel is a physical downlink shared channel, PDSCH, and the second physical channel is a physical uplink control channel, PUCCH.

6. The method of claim 4, wherein the procedure related to the first serving cell comprises the wireless device stopping at least one of channel state information, CSI, reporting, physical downlink control channel, PDCCH, monitoring and sounding reference signal, SRS, transmission on the first serving cell in response to the command for deactivation of the first serving cell.

7. A wireless device configured to communicate with a network node, the wireless device comprising processing circuitry, the processing circuitry configured to cause the wireless device to:
determine a deactivation of a first serving cell associated with a first physical channel, the deactivation being based on one of two different time offsets for applying serving cell deactivation actions for the first serving cell;
a first time offset being used when the first serving cell is deactivated using an explicit deactivation command; and
a second time offset being used when the first serving cell is deactivated upon expiration of a deactivation timer, the first serving cell being a secondary serving cell;
send, when the first serving cell is deactivated using an explicit deactivation command, a corresponding Hybrid Automatic Repeat reQuest, HARQ, acknowledgment, ACK, in a second physical channel, a subcarrier spacing configuration of the first physical channel being different from a subcarrier spacing configuration of the second physical channel; and
perform a procedure related to the first serving cell based at least in part on the first time offset when the cell is deactivated using the explicit deactivation command and the second time offset when the cell is deactivated upon expiration of the deactivation timer, the first time offset being based at least in part on the subcarrier spacing configuration of the second physical channel, and the second time offset being based at least in part on information related to a physical channel of a scheduling cell of the first serving cell for which the deactivation timer expires.

8. A network node configured to communicate with a wireless device, the network node comprising processing circuitry, the processing circuitry configured to cause the network node to:
determine a deactivation of a first serving cell associated with a first physical channel, the deactivation being based on one of two different time offsets for applying serving cell deactivation actions for the first serving cell:
a first time offset being used when the first serving cell is deactivated using an explicit deactivation command; and
a second time offset being used when the first serving cell is deactivated upon expiration of a deactivation timer, the first serving cell being a secondary serving cell; and
receive, when the first serving cell is deactivated using an explicit deactivation command, a corresponding Hybrid Automatic Repeat reQuest, HARQ, acknowledgment, ACK, in a second physical channel, a subcarrier spacing configuration of the first physical channel being different from a subcarrier spacing configuration of the second physical channel, and the deactivation of the first serving cell initiating a procedure related to the first serving cell, the procedure being based at least in part on the first time offset when the cell is deactivated using the explicit deactivation command and the second time offset when the cell is deactivated upon expiration of the deactivation timer, the first time offset being based at least in part on the subcarrier spacing configuration of the second physical channel, and the second time offset being based at least in part on information related to a physical channel of a scheduling cell of the first serving cell for which the deactivation timer expires.

9. The method of claim 1, where the second time offset is a fixed value.

10. The method of claim 1, wherein the second time offset is a pre-defined number of slots per subframe for a subcarrier spacing, SCS, configuration.

11. The method of claim 4, where the second time offset is a fixed value.

12. The method of claim 4, wherein the second time offset is a pre-defined number of slots per subframe for a subcarrier spacing, SCS, configuration.

* * * * *

UNITED STATES PATENT AND TRADEMARK OFFICE
CERTIFICATE OF CORRECTION

PATENT NO. : 12,238,044 B2
APPLICATION NO. : 17/602537
DATED : February 25, 2025
INVENTOR(S) : Nory et al.

It is certified that error appears in the above-identified patent and that said Letters Patent is hereby corrected as shown below:

In the Specification

In Column 11, Line 8, delete "equipped" and insert -- equipment --, therefor.

In Column 14, Line 34, delete "Circuitry)" and insert -- Circuit) --, therefor.

In Column 15, Line 41, delete "Circuitry)" and insert -- Circuit) --, therefor.

In Column 16, Line 22, delete "Circuitry)" and insert -- Circuit) --, therefor.

In Column 27, Line 51, delete "Rein," and insert -- Scell1, --, therefor.

In Column 30, Line 30, delete "$k=\text{Ceil}((k_1+3 \cdot N_{slot}^{subframe,k=\mu}+1) \cdot 2^{\mu PDSCH-\mu}.$" and insert -- $k=\text{Ceil}((k_1+3 \cdot N_{slot}^{subframe,k=\mu}+1) \cdot 2^{\mu PDSCH-\mu}).$ --, therefor.

In Column 30, Line 33-34, delete "$k=\text{round}((k_1+3 \cdot N_{slot}^{subframe,k=\mu}+1) \cdot 2^{\mu PDSCH-\mu}.$" and insert -- $k=\text{round}((k_1+3 \cdot N_{slot}^{subframe,k=\mu}+1) \cdot 2^{\mu PDSCH-\mu}).$ --, therefor.

In Column 30, Line 38, delete "$k=m1=(k_1+3 \cdot N_{slot}^{subframe,\mu}+1) \cdot 2^{\mu PDSCH-\mu}$" and insert -- $k-m1-(k_1+3 \cdot N_{slot}^{subframe,\mu}+B) \cdot 2^{\mu PDSCH-\mu}$ --, therefor.

In Column 30, Lines 53-54, delete "$k=\text{floor}((k_1 + A \cdot N_{slot}^{subframe,\mu}+B) \cdot 2^{\mu PDSCH-\mu}.$" and insert -- $k=\text{floor}((k_1 + A \cdot N_{slot}^{subframe,\mu}+B) \cdot 2^{\mu PDSCH-\mu}).$ --, therefor.

In Column 32, Line 25, delete "$[(k_1+3 \cdot N_{slot}^{subframe,\mu}+1) \cdot 2^{\mu PDSCH\mu}]$" and insert -- $[(k_1+3 \cdot N_{slot}^{subframe,\mu}+1) \cdot 2^{\mu PDSCH-\mu}]$ --, therefor.

In Column 32, Line 54, delete "$k=4 \cdot N_{slot}^{subframe,\mu PDCCH\mu}$" and insert -- $k=4 \cdot N_{slot}^{subframe,\mu PDCCH}$ --, therefor.

In Column 33, Line 32, delete "$k=4 \cdot N_{slot}^{subframe,\mu PDCCH\mu}$" and insert -- $k=4 \cdot N_{slot}^{subframe,\mu PDCCH}$ --, therefor.

Signed and Sealed this
Seventh Day of October, 2025

John A. Squires
*Director of the United States Patent and Trademark Office*

CERTIFICATE OF CORRECTION (continued)
U.S. Pat. No. 12,238,044 B2

In the Claims

In Column 36, Line 65, in Claim 1, delete "being is" and insert -- is --, therefor.